(12) United States Patent
Shah et al.

(10) Patent No.: US 10,699,286 B2
(45) Date of Patent: Jun. 30, 2020

(54) METHODS AND APPARATUS TO CORRECT ATTRIBUTION ERRORS AND COVERAGE BIAS FOR DIGITAL AUDIO RATINGS

(71) Applicant: The Nielsen Company (US), LLC, New York, NY (US)

(72) Inventors: Dipti Umesh Shah, Pleasanton, CA (US); Edward Ellis Cohen, New Market, MD (US); Antonia Toupet, Sunnyvale, CA (US); Helena Mendrisova, Hoffman Estates, IL (US)

(73) Assignee: The Nielsen Company (US), LLC, New York, NY (US)

( * ) Notice: Subject to any disclaimer, the term of this patent is extended or adjusted under 35 U.S.C. 154(b) by 954 days.

(21) Appl. No.: 15/194,113

(22) Filed: Jun. 27, 2016

(65) Prior Publication Data

US 2016/0379234 A1 Dec. 29, 2016

Related U.S. Application Data

(60) Provisional application No. 62/185,420, filed on Jun. 26, 2015.

(51) Int. Cl.
*G06Q 30/02* (2012.01)
*H04H 60/58* (2008.01)
(Continued)

(52) U.S. Cl.
CPC ..... *G06Q 30/0204* (2013.01); *G06Q 30/0241* (2013.01); *H04H 60/31* (2013.01);
(Continued)

(58) Field of Classification Search
CPC .......... G06Q 30/0207–3/0277; G06Q 30/00–30/0284
(Continued)

(56) References Cited

U.S. PATENT DOCUMENTS

2003/0050827 A1* 3/2003 Hennessey ............ G06Q 30/06
705/400
2012/0072469 A1* 3/2012 Perez ................. G06Q 30/0201
707/810

OTHER PUBLICATIONS

Karskens, Jozeifien, "Predicting someone's social demographic profile based on the digital footprint", Master's Thesis Business Analytics, Aug. 2014, pp. 1-46 (Year: 2014).*

* cited by examiner

*Primary Examiner* — John Van Bramer
(74) *Attorney, Agent, or Firm* — Hanley, Flight and Zimmerman, LLC

(57) ABSTRACT

Methods, apparatus, systems and articles of manufacture to correct attribution errors and coverage bias for digital audio ratings are disclosed. An example method includes applying, by executing an instruction with a processor, a duration-based count matrix to first demographic data associated with collected impressions of digital audio to determine second demographic data, the duration-based count matrix being based on a misattribution adjustment matrix, applying, by executing an instruction with the processor, a coverage adjustment vector to the second demographic data to determine third demographic data, applying, by executing an instruction with the processor, a scaling factor to the third demographic data to determine fourth demographic data, and generating, by executing an instruction with the processor, ratings data at a daypart-level using the fourth demographic data, the ratings data associated with the digital audio.

11 Claims, 10 Drawing Sheets

(51) Int. Cl.
   *H04H 60/45*      (2008.01)
   *H04H 60/31*      (2008.01)
   *H04H 60/76*      (2008.01)
   *H04L 29/06*      (2006.01)

(52) U.S. Cl.
   CPC ............ *H04H 60/45* (2013.01); *H04H 60/58* (2013.01); *H04H 60/76* (2013.01); *H04H 2201/37* (2013.01); *H04L 65/4076* (2013.01)

(58) Field of Classification Search
   USPC ........................... 705/14.1–14.73, 7.11–7.42
   See application file for complete search history.

METHODS AND APPARATUS TO CORRECT ATTRIBUTION ERRORS AND COVERAGE BIAS FOR DIGITAL AUDIO RATINGS

RELATED APPLICATION

This patent claims the benefit of, and priority from, U.S. Provisional Patent Application No. 62/185,420, filed Jun. 26, 2015, entitled "METHODS AND APPARATUS TO CORRECT ATTRIBUTION ERROR AND COVERAGE BIAS FOR BROADCAST STATIONS AND DIGITAL STATIONS." U.S. Provisional Patent Application No. 62/185,420 is hereby incorporated by reference in its entirety.

FIELD OF THE DISCLOSURE

This disclosure relates generally to audience measurement, and, more particularly, to methods and apparatus to correct attribution errors and coverage bias for digital audio ratings.

BACKGROUND

Traditionally, audience measurement entities determine compositions of audiences exposed to media by monitoring registered panel members and extrapolating their behavior onto a larger population of interest. That is, an audience measurement entity enrolls people that consent to being monitored into a panel and collects relatively highly accurate demographic information from those panel members via, for example, in-person, telephonic and/or online interviews (e.g., surveys). The audience measurement entity then monitors those panel members to determine media exposure information identifying media (e.g., television programs, ratio programs, movies, streaming media, etc.) exposed to those panel members. By combining the media exposure information with the demographic information for the panel members, and by extrapolating the result to the larger population of interest, the audience measurement entity can determine detailed audience measurement information such as media ratings, audience composition, reach, etc. This audience measurement information can be used by advertisers to, for example, place advertisements with specific media to target audiences of specific demographic compositions.

More recent techniques employed by audience measurement entities monitor exposure to Internet-accessible media or, more generally, online media. These techniques expand the available set of monitored individuals to a sample population that may or may not include registered panel members. In some such techniques, demographic information for these monitored individuals can be obtained from one or more database proprietors (e.g., social network sites, multi-service sites, online retailer sites, credit services, etc.) with which the individuals subscribe to receive one or more online services. However, the demographic information available from these database proprietor(s) may be self-reported and, thus, unreliable or less reliable than the demographic information typically obtained for panel members registered by an audience measurement entity.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
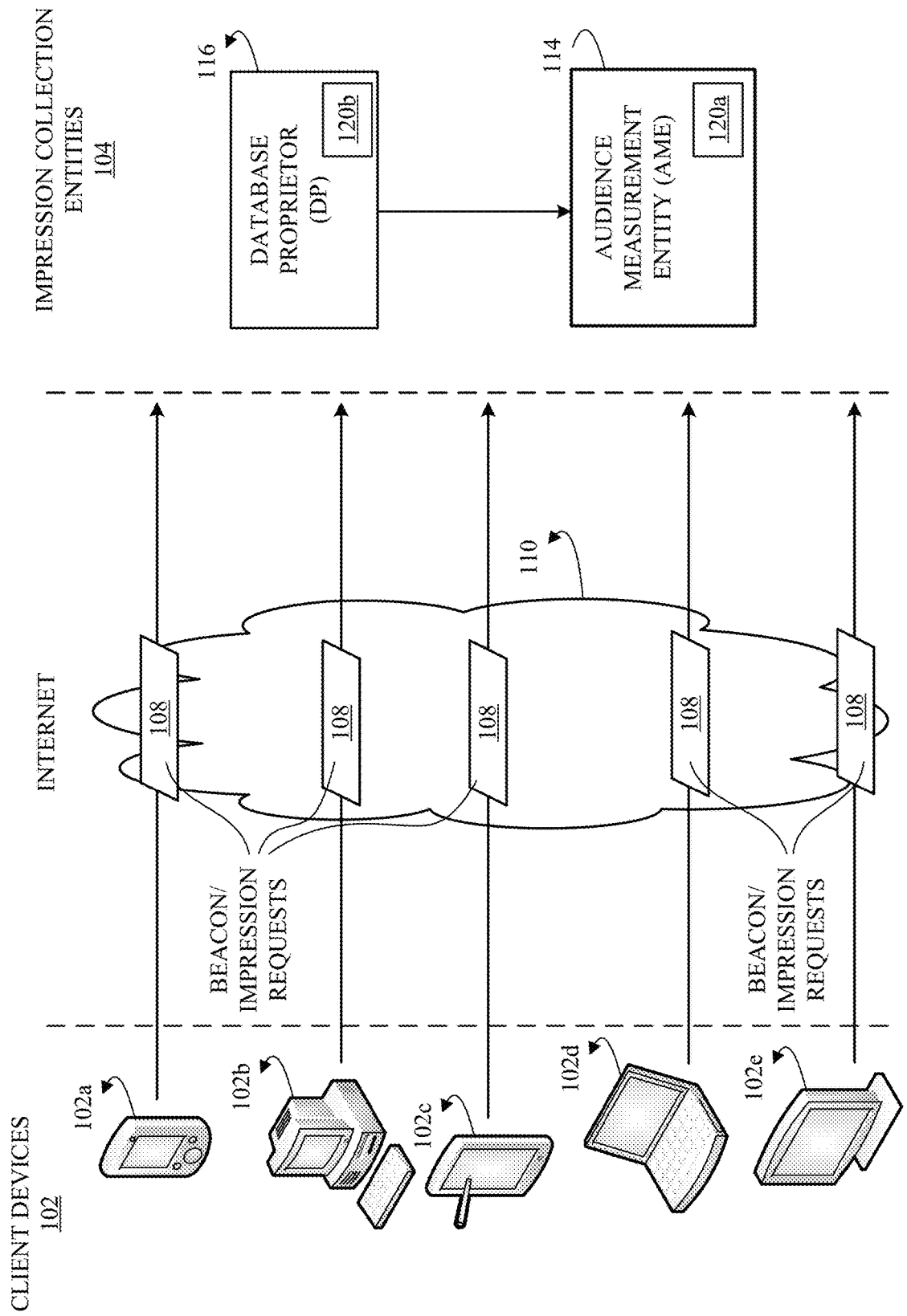
FIG. 1 illustrates example client devices that report audience and/or impressions for Internet-based media to impression collection entities to facilitate identifying numbers of impressions and sizes of audiences exposed to different Internet-based media.

In online audience measurement, collecting information about audiences and impressions from unknown viewers presents a risk of reporting biased demographic compositions in ratings information (e.g., average minute audience, exposures, duration, and unique audience). Examples disclosed herein reduce the risk of bias in the demographic compositions by correcting for sample bias and/or attribution error present in database proprietor data.

In disclosed examples, an online user accesses an application to stream audio that has been provided with a set of instructions or information (e.g., via a software development kit (SDK) provided by an audience measurement entity such as The Nielsen Company). When the online user, who may or may not have a prior relationship with the audience measurement entity, accesses the application, different types of messages are generated and sent by the online user's device via a communications network. One or more of the messages are sent to a database proprietor's server and one or more of the messages are sent to the audience measurement entity's servers.

The message(s) sent to the database proprietor's server include a cookie and/or other identifier that enable(s) the database proprietor to match the online user to demographic information. The database proprietor attributes the impression to a user account corresponding to the cookie value, and subsequently aggregates the impressions, sessions and/or audience count based on the demographics associated with the user accounts. The message(s) sent to the audience measurement entity and/or the database proprietor enable the audience measurement entity and/or the database proprietor to measure the portions of the media (e.g., audio) presented via the online user's device.

Among the potential sources of bias in the demographic information provided by the database proprietor is coverage of the online user. For example, not everyone in a population has the database proprietor cookie that enables the database proprietor to match the impression to an online profile. For example, a user may not have an account with the database proprietor and/or the user may have an account with the database proprietor but has deleted the database proprietor cookie or otherwise does not have the database proprietor cookie set at a client device at the time of media exposure via the client device. As a result, the database proprietor is not able to match the impressions to demographic information. A failure to match impressions results in a failure to report, for example, audience, exposure or duration information for those impressions and, thus, an underestimation of the audience count, exposure count and/or duration for the demographic group to which the online user belongs.

Another potential source of bias in the demographic information arises from misattribution, in which the online user's device is used by multiple users in a household. The other users may or may not have an account with a database proprietor. For example, if a first user that logged into the database proprietor on the device at a first time is not the same user using the device at a second time during a media presentation, any impressions, sessions, audience, and/or duration logged based on the database proprietor cookie corresponding to the first user may be misattributed to an incorrect demographic group. As a result, misattribution may result in overestimation of the audience count and/or duration for the demographic group of the user corresponding to the cookie and underestimation of the audience count and/or duration for the demographic group of the actual user that was exposed to the media.

The example sources of bias described above arise in techniques for measuring online audiences for media in which exposure data is collected from unknown (e.g., anonymous) users and third-party demographic information is used to ascertain the demographic composition of the unknown users. While such techniques provide the benefit of more accurate measurements of larger audiences by including unknown or anonymous users, the use of message transmission from the client devices to the audience measurement entity and/or to the database proprietor as well as the use of cookie (or other identifier) matching at the database proprietor results in the inclusion of the above-described sources of bias in the demographic information obtained from the database proprietor.

FIG. 1 is a diagram of an example environment in which a system 100 constructed in accordance with the teachings of this disclosure operates to correct attribution errors and coverage bias for digital audio streaming stations (e.g., broadcast stations and digital stations). The example system 100 of FIG. 1 includes example client devices 102 (e.g., 102a, 102b, 102c, 102d, 102e) that report audience counts, durations, sessions and/or quarter-hours for online (e.g., Internet-based) media (e.g., streaming audio, digital audio, etc.) to impression collection entities 104 to facilitate determining durations and sizes of audiences exposed to different online media. An "impression" generally refers to an instance of an individual's exposure to digital audio (e.g., content, advertising, etc.). As used herein, the term "impression collection entity" refers to any entity that collects impression data, such as, for example, audience measurement entities and database proprietors that collect impression data. As used herein, duration refers to an amount of time of presentation of digital audio, which may be credited to an impression. For example, an impression may correspond to a duration of 1 minute, 1 minute 30 seconds, 2 minutes, etc.

The client devices 102 of the illustrated example may be implemented by any device capable of accessing a streaming station over a network. For example, the client devices 102a-e may be a desktop computer, a tablet, a mobile device, a smart television, or any other Internet-capable device or appliance. Examples disclosed herein may be used to collect impression information for any type of media. As used herein, the term "media" includes any type of audio content and/or aural advertisement delivered via a digital audio streaming station. Thus, media includes radio programming or advertisements, streaming audio, etc.

In the illustrated example, the client devices 102 employ web browsers and/or applications to access streaming audio. Some of the web browsers, applications and/or streaming audio include instructions that cause the client devices 102 to report media monitoring information to one or more of the impression collection entities 104. For example, when a client device 102 of the illustrated example accesses streaming audio that is instantiated with (e.g., linked to, embedded with, etc.) one or more monitoring instructions, a web browser and/or application of the client device 102 executes the one or more instructions (e.g., monitoring instructions, sometimes referred to herein as beacon instruction(s)) in the streaming audio to cause the executing client device 102 to send a beacon request or impression request 108 to one or more impression collection entities 104 via, for example, a network 110. The example network 110 of the illustrated example of FIG. 1 is the Internet. However, the example network 110 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 110 enables the client devices 102 to be in communication with the impression collection entities 104. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time events.

The beacon request 108 of the illustrated example includes information about the access to the instantiated media at the corresponding client device 102 generating the beacon request. Such beacon requests allow monitoring entities, such as the impression collection entities 104, to collect impressions for different streaming audio accessed via the client devices 102. In this manner, the impression collection entities 104 can generate large impression quantities for different digital audio (e.g., different content and/or advertisement campaigns). Example techniques for using beacon instructions and beacon requests to cause devices to collect impressions for different media accessed via client devices are further disclosed in U.S. Pat. No. 6,108,637 to Blumenau and U.S. Pat. No. 8,370,489 to Mainak, et al., which are incorporated herein by reference in their respective entireties.

The impression collection entities 104 of the illustrated example include an example audience measurement entity (AME) 114 and an example database proprietor (DP) 116. In the illustrated example, the AME 114 does not provide the digital audio to the client devices 102 and is a trusted (e.g., neutral) third party (e.g., The Nielsen Company, LLC) for providing accurate media access statistics. In the illustrated example, the database proprietor 116 is one of many database proprietors that operate on the Internet to provide one or more services. Such services may include, but are not limited to, email services, social networking services, news media services, cloud storage services, streaming music services, streaming video services, online shopping services, credit monitoring services, etc. Example database proprietors include social network sites (e.g., Facebook, Twitter, MySpace, etc.), multi-service sites (e.g., Yahoo!, Google, etc.), online shopping sites (e.g., Amazon.com, Buy.com, etc.), credit services (e.g., Experian), and/or any other type(s) of web service site(s) that maintain user registration records. In examples disclosed herein, the database proprietor 116 maintains user account records corresponding to users registered for Internet-based services provided by the database proprietors. That is, in exchange for the provision of services, subscribers register with the database proprietor 116. As part of this registration, the subscriber may provide detailed demographic information to the database proprietor 116. The demographic information may include, for example, gender, age, ethnicity, income, home location, education level, occupation, etc. In the illustrated example of FIG. 1, the database proprietor 116 sets a device/user identifier (e.g., an identifier described below in connection with FIG. 2) on a subscriber's client device 102 that enables the database proprietor 116 to identify the subscriber in subsequent interactions.

In the illustrated example, when the database proprietor 116 receives a beacon request 108 from a client device 102, the database proprietor 116 requests the client device 102 to provide the device/user identifier that the database proprietor 116 had previously set for the client device 102. The database proprietor 116 uses the device/user identifier corresponding to the client device 102 to identify demographic information in its user account records corresponding to the subscriber of the client device 102. In this manner, the database proprietor 116 can generate "demographic impressions" by associating demographic information with an impression for the digital audio accessed at the client device 102. Thus, as used herein, a "demographic impression" is defined to be an impression that is associated with one or more characteristic(s) (e.g., a demographic characteristic) of the person(s) exposed to the digital audio in the impression. Through the use of demographic impressions, which associate monitored (e.g., logged) media impressions (e.g., beacon requests) with demographic information, it is possible to measure digital audio exposure and, by extension, infer digital audio consumption behaviors across different demographic classifications (e.g., groups) of a sample population of individuals.

In the illustrated example, the AME 114 establishes a panel of users who have agreed to provide their demographic information and to have their Internet browsing activities monitored. When an individual joins the AME panel, the person provides detailed information concerning the person's identity and demographics (e.g., gender, age, ethnicity, income, home location, occupation, etc.) to the AME 114. The AME 114 sets a device/user identifier (e.g., an identifier described below in connection with FIG. 2) on the person's client device 102 that enables the AME 114 to identify the panelist.

In the illustrated example, when the AME 114 receives a beacon request 108 from a client device 102, the AME 114 requests the client device 102 to provide the AME 114 with the device/user identifier the AME 114 previously set for the client device 102. The AME 114 uses the device/user identifier corresponding to the client device 102 to identify demographic information in its user AME panelist records corresponding to the panelist of the client device 102. In this manner, the AME 114 can generate demographic impressions by associating demographic information with an audience for the media accessed at the client device 102 as identified in the corresponding beacon request.

In the illustrated example, the database proprietor 116 reports demographic impression data to the AME 114. To preserve the anonymity of its subscribers, the demographic impression data may be anonymous demographic impression data and/or aggregated demographic impression data. In the case of anonymous demographic impression data, the database proprietor 116 reports user-level demographic impression data (e.g., which is resolvable to individual subscribers), but with any personally identifiable information (PII) removed from or obfuscated (e.g., scrambled, hashed, encrypted, etc.) in the reported demographic impression data. For example, anonymous demographic impression data, if reported by the database proprietor 116 to the AME 114, may include respective demographic impression data for each device 102 from which a beacon request 108 was received, but with any personal identification information removed from or obfuscated in the reported demographic impression data. In the case of aggregated demographic impression data, individuals are grouped into different demographic classifications, and aggregate demographic data (e.g., which is not resolvable to individual subscribers) for the respective demographic classifications is reported to the AME 114. In some examples, the aggregated data is aggregated demographic impression data. In other examples, the database proprietor 116 is not provided with impression data that is resolvable to a particular media name (but may instead be given a code or the like that the AME 114 can map to the particular media name and/or other media identifier) and the reported aggregated demographic data may thus not be mapped to impressions or may be mapped to the code(s) associated with the impressions.

Aggregate demographic data, if reported by the database proprietor 116 to the AME 114, may include first demographic data aggregated for devices 102 associated with demographic information belonging to a first demographic classification (e.g., a first age group, such as a group which includes ages less than 18 years old), second demographic data for devices 102 associated with demographic information belonging to a second demographic classification (e.g., a second age group, such as a group which includes ages from 18 years old to 34 years old), etc.

As mentioned above, demographic information available for subscribers of the database proprietor 116 may be unreliable, or less reliable than the demographic information obtained for panel members registered by the AME 114. There are numerous social, psychological and/or online safety reasons why subscribers of the database proprietor 116 may inaccurately represent or even misrepresent their demographic information, such as age, gender, etc. Accordingly, one or more of the AME 114 and/or the database proprietor 116 determine sets of classification probabilities for respective individuals in the sample population for which demographic data is collected. A given set of classification probabilities represents likelihoods that a given individual in a sample population belongs to respective ones of a set of possible demographic classifications. For example, the set of classification probabilities determined for a given individual in a sample population may include a first probability that the individual belongs to a first one of possible demographic classifications (e.g., a first age classification, such as a first age group), a second probability that the individual belongs to a second one of the possible demographic classifications (e.g., a second age classification, such as a second age group), etc. In some examples, the AME 114 and/or the database proprietor 116 determine the sets of classification probabilities for individuals of a sample population by combining, with models, decision trees, etc., the individuals' demographic information with other available behavioral data that can be associated with the individuals to estimate, for each individual, the probabilities that the individual belongs to different possible demographic classifications in a set of possible demographic classifications. Example techniques for reporting demographic data from the database proprietor 116 to the AME 114, and for determining sets of classification probabilities representing likelihoods that individuals of a sample population belong to respective possible demographic classifications in a set of possible demographic classifications, are further disclosed in U.S. Patent Publication No. 2012/0072469 (Perez et al.) and U.S. patent application Ser. No. 14/604,394 to (Sullivan et al.), which are incorporated herein by reference in their respective entireties.

In the illustrated example, one or both of the AME 114 and the database proprietor 116 include example audience data generators 120 to determine ratings data for digital audio in accordance with the teachings of this disclosure. For example, the AME 114 may include an example audience data generator 120a and/or the database proprietor 116 may include an example audience data generator 120b. As disclosed in further detail below, the audience data generator(s) 120a and/or 120b of the illustrated example process sets of classification probabilities determined by the AME 114 and/or the database proprietor 116 for monitored individuals of a sample population (e.g., corresponding to a population of individuals associated with the devices 102 from which beacon requests 108 were received) to estimate parameters characterizing population attributes (also referred to herein as population attribute parameters) associated with the set of possible demographic classifications.

In some examples, such as when the audience data generator 120b is implemented at the database proprietor 116, the sets of classification probabilities processed by the audience data generator 120b to estimate the population attribute parameters include personal identification information which permits the sets of classification probabilities to be associated with specific individuals. Associating the classification probabilities enables the audience data generator 120b to maintain consistent classifications for individuals over time, and the audience data generator 120b may scrub the PII from the impression information prior to reporting impressions based on the classification probabilities. In some examples, such as when the audience data generator 120a is implemented at the AME 114, the sets of classification probabilities processed by the audience data generator 120a to estimate the population attribute parameters are included in reported, anonymous demographic data and, thus, do not include PII. However, the sets of classification probabilities can still be associated with respective, but unknown, individuals using, for example, anonymous identifiers (e.g., hashed identifiers, scrambled identifiers, encrypted identifiers, etc.) included in the anonymous demographic data.

In some examples, such as when the audience data generator 120a is implemented at the AME 114, the sets of classification probabilities processed by the audience data generator 120a to estimate the population attribute parameters are included in reported, aggregate demographic impression data and, thus, do not include personal identification and are not associated with respective individuals but, instead, are associated with respective aggregated groups of individuals. For example, the sets of classification probabilities included in the aggregate demographic impression data may include a first set of classification probabilities representing likelihoods that a first aggregated group of individuals belongs to respective possible demographic classifications in a set of possible demographic classifications, a second set of classification probabilities representing likelihoods that a second aggregated group of individuals belongs to the respective possible demographic classifications in the set of possible demographic classifications, etc.

Using the estimated population attribute parameters, the audience data generator(s) 120a and/or 120b of the illustrated example determine ratings data for digital audio, as disclosed in further detail below. For example, the audience data generator(s) 120a and/or 120b may process the estimated population attribute parameters to further estimate numbers of individuals across different demographic classifications who were exposed to given media, numbers of media impressions across different demographic classifications for the given media, accuracy metrics for the estimate number of individuals, numbers of media impressions, average minute audience (AMA), average quarter-hour (AQH), total listening hours (TLH), time-spent listening (TSL), etc.

Figure 2:
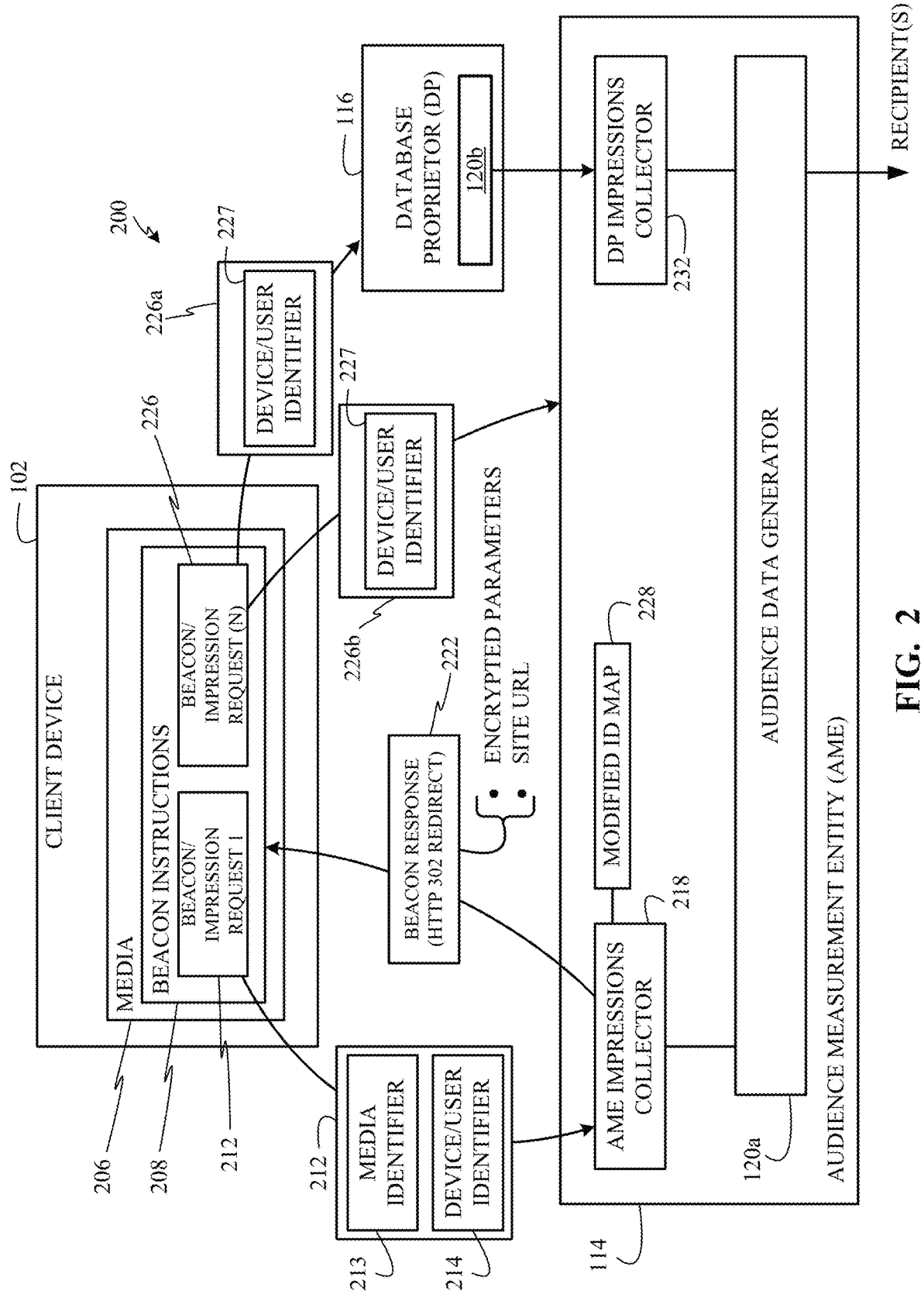
FIG. 2 is an example communication flow diagram illustrating an example manner in which an example audience measurement entity and an example database proprietor can collect impressions and demographic information associated with a client device, and can further correct attribution errors and coverage bias for broadcast stations and digital stations in accordance with the teachings of this disclosure.

FIG. 2 is an example communication flow diagram 200 illustrating an example manner in which the AME 114 and the database proprietor 116 can cooperate to collect demographic impressions based on client devices 102 reporting impressions (e.g., communication beacon requests) to the AME 114 and/or the database proprietor 116. FIG. 2 also shows the example audience data generators 120a and 120b, which are able to determine ratings data for digital audio in accordance with the teachings of this disclosure. The example chain of events shown in FIG. 2 occurs when a client device 102 accesses streaming audio for which the client device 102 reports an impression to the AME 114 and/or the database proprietor 116. In some examples, the client device 102 reports impressions for accessed streaming audio based on beacon instructions (e.g., machine executable instructions such as code, a script, etc.) associated with (e.g., embedded in) applications or web browsers that execute on the client device 102 to send the beacon/impression requests 108 of FIG. 1 to the AME 114 and/or the database proprietor 116 for digital audio accessed via those applications or web browsers. In some examples, the beacon/impression requests include device/user identifiers (e.g., AME IDs and/or DP IDs) as described further below to allow the corresponding AME 114 and/or the corresponding database proprietor 116 to associate demographic information with resulting logged impressions (e.g., received beacon/impression requests).

In the illustrated example, the client device 102 accesses tagged digital audio 206 that is tagged with beacon instructions 208. The beacon instructions 208 cause the client device 102 to send a beacon/impression request 212 to an AME impressions collector 218 when the client device 102 accesses the digital audio 206. For example, a web browser and/or application of the client device 102 executes the beacon instructions 208 in the digital audio 206, which instruct the browser and/or the application to generate and send the beacon/impression request 212. In the illustrated example, the client device 102 sends the beacon/impression request 212 using an HTTP (hypertext transfer protocol) request addressed to the URL (uniform resource locator) of the AME impressions collector 218 at, for example, a first Internet domain of the AME 114. The beacon/impression request 212 of the illustrated example includes a media identifier 213 identifying the digital audio 206 (e.g., an identifier that can be used to identify the streaming station, such as ACME FM). In some examples, the beacon/impression request 212 also includes a metro identifier identifying a geographic location associated with the streaming station. For example, a streaming station (e.g., ACME FM) may be accessible in a first geographic location (e.g., Chicago) and also accessible in a second geographic location (e.g., San Francisco). In addition or alternatively, multiple streaming stations may be monitored in a same geographic location. For example, a first station (e.g., ACME FM) and a second station (e.g., ACME AM) may be monitored in a same geographic location (e.g., Chicago). In such instances, it may be beneficial to pair the streaming station and the geographic location (e.g., referred to herein as a "metro-station" pairing). In some examples, the beacon request 212 also includes a provider identifier of a provider (or distributor) that served the digital audio 206 to the client device 102. For example, the provider identifier may be a URL, a host website ID (e.g., www.acme.com), an application ID, etc. Example providers include Pandora Media, Inc., iHeartMedia, Inc., TuneIn, Inc., etc.

In the illustrated example, the beacon/impression request 212 includes a device/user identifier 214. In the illustrated example, the device/user identifier 214 that the client device 102 provides to the AME impressions collector 218 in the beacon/impression request 212 is an AME ID because it corresponds to an identifier that the AME 114 uses to identify a panelist corresponding to the client device 102. In other examples, the client device 102 may not send the device/user identifier 214 until the client device 102 receives a request for the same from a server of the AME 114 in response to, for example, the AME impressions collector 218 receiving the beacon/impression request 212.

In some examples, the device/user identifier 214 may be a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an Adobe Flash® client identifier, identification information stored in an HTML5 data store (where HTML is an abbreviation for hypertext markup language) and/or any other identifier that the AME 114 stores in association with demographic information about users of the client devices 102. In this manner, when the AME 114 receives the device/user identifier 214, the AME 114 can obtain demographic information corresponding to a user of the client device 102 based on the device/user identifier 214 that the AME 114 receives from the client device 102. In some examples, the device/user identifier 214 may be encrypted (e.g., hashed) at the client device 102 so that only an intended final recipient of the device/user identifier 214 can decrypt the hashed identifier 214. For example, if the device/user identifier 214 is a cookie that is set in the client device 102 by the AME 114, the device/user identifier 214 can be hashed so that only the AME 114 can decrypt the device/user identifier 214. If the device/user identifier 214 is an IMEI number, the client device 102 can hash the device/user identifier 214 so that only a wireless carrier (e.g., the database proprietor 116) can decrypt the hashed identifier 214 to recover the IMEI for use in accessing demographic information corresponding to the user of the client device 102. By hashing the device/user identifier 214, an intermediate party (e.g., an intermediate server or entity on the Internet) receiving the beacon request cannot directly identify a user of the client device 102.

In response to receiving the beacon/impression request 212, the AME impressions collector 218 logs an impression (e.g., a beacon activity) for the digital audio 206 by storing the media identifier 213 contained in the beacon/impression request 212. In the illustrated example of FIG. 2, the AME impressions collector 218 also uses the device/user identifier 214 in the beacon/impression request 212 to identify AME panelist demographic information corresponding to a panelist of the client device 102. That is, the device/user identifier 214 matches a user ID of a panelist member (e.g., a panelist corresponding to a panelist profile maintained and/or stored by the AME 114). In this manner, the AME impressions collector 218 can associate the logged impression with demographic information of a panelist corresponding to the client device 102. In some examples, the AME impressions collector 218 determines (e.g., in accordance with the examples disclosed in U.S. Patent Publication No. 2012/0072469 to Perez et al. and/or U.S. patent application Ser. No. 14/604,394 to Sullivan et al.) a set of classification probabilities for the panelist to include in the demographic information associated with the logged impression. As described above and in further detail below, the set of classification probabilities represent likelihoods that the panelist belongs to respective ones of a set of possible demographic classifications (e.g., such as likelihoods that the panelist belongs to respective ones of a set of possible age groupings, etc.).

In some examples, the beacon/impression request 212 is an impression message, or I beacon, which is a non-durational message that is transmitted by the client device 102 when the digital audio 206 is loaded. In some examples, the beacon/impression request 212 may not include the device/user identifier 214 (e.g., if the user of the client device 102 is not an AME panelist). In such examples, the AME impressions collector 218 logs impressions regardless of whether the client device 102 provides the device/user identifier 214 in the beacon/impression request 212 (or in response to a request for the device/user identifier 214). When the client device 102 does not provide the device/user identifier 214, the AME impressions collector 218 can still benefit from logging an impression for the digital audio 206 even though it does not have corresponding demographics. For example, the AME 114 may still use the logged impression to generate a total impressions count and/or a frequency of impressions (e.g., an average number of impressions per unique audience member) for the digital audio 206. Additionally or alternatively, the AME 114 may obtain demographics information from the database proprietor 116 for the logged impression if the client device 102 corresponds to a subscriber of the database proprietor 116.

In the illustrated example of FIG. 2, to compare or supplement panelist demographics (e.g., for accuracy or completeness) of the AME 114 with demographics from one or more database proprietors (e.g., the database proprietor 116), the AME impressions collector 218 returns a beacon response message 222 (e.g., a first beacon response) to the client device 102 including an HTTP "302 Found" re-direct message and a URL of a participating database proprietor 116 at, for example, a second Internet domain different than the Internet domain of the AME 114. In the illustrated example, the HTTP "302 Found" re-direct message in the beacon response 222 instructs the client device 102 to send a second beacon request 226 to the database proprietor 116. In other examples, instead of using an HTTP "302 Found" re-direct message, redirects may be implemented using, for example, an iframe source instruction (e.g., <iframe src=" ">) or any other instruction that can instruct a client device to send a subsequent beacon request (e.g., the second beacon request 226) to a participating database proprietor 116. In the illustrated example, the AME impressions collector 218 determines the database proprietor 116 specified in the beacon response 222 using a rule and/or any other suitable type of selection criteria or process. In some examples, the AME impressions collector 218 determines a particular database proprietor to which to redirect a beacon request based on, for example, empirical data indicative of which database proprietor is most likely to have demographic data for a user corresponding to the device/user identifier 214. In some examples, the beacon instructions 208 include a pre-defined URL of one or more database proprietors to which the client device 102 should send follow up beacon requests 226. In other examples, the same database proprietor is always identified in the first redirect message (e.g., the beacon response 222).

In the illustrated example of FIG. 2, the beacon/impression request 226 may include a device/user identifier 227 that is a DP ID because it is used by the database proprietor 116 to identify a subscriber of the client device 102 when logging an impression. In some instances (e.g., in which the database proprietor 116 has not yet set a DP ID in the client device 102), the beacon/impression request 226 does not include the device/user identifier 227. In some examples, the DP ID is not sent until the database proprietor 116 requests the same (e.g., in response to the beacon/impression request 226). In some examples, the device/user identifier 227 is a device identifier (e.g., an IMEI), an MEID, a MAC address, etc.), a web browser unique identifier (e.g., a cookie), a user identifier (e.g., a user name, a login ID, etc.), an Adobe Flash® client identifier, identification information stored in an HTML5 data store and/or any other identifier that the database proprietor 116 stores in association with demographic information about subscribers corresponding to the client devices 102. In some examples, the device/user identifier 227 may be encrypted (e.g., hashed) at the client device 102 so that only an intended final recipient of the device/user identifier 227 can decrypt the hashed identifier 227. For example, if the device/user identifier 227 is a cookie that is set in the client device 102 by the database proprietor 116, the device/user identifier 227 can be hashed so that only the database proprietor 116 can decrypt the device/user identifier 227. If the device/user identifier 227 is an IMEI number, the client device 102 can hash the device/user identifier 227 so that only a wireless carrier (e.g., the database proprietor 116) can decrypt the hashed identifier 227 to recover the IMEI for use in accessing demographic information corresponding to the user of the client device 102. By hashing the device/user identifier 227, an intermediate party (e.g., an intermediate server or entity on the Internet) receiving the beacon request cannot directly identify a user of the client device 102. For example, if the intended final recipient of the device/user identifier 227 is the database proprietor 116, the AME 114 cannot recover identifier information when the device/user identifier 227 is hashed by the client device 102 for decrypting only by the intended database proprietor 116.

In the example of FIG. 2, the beacon instructions 208 cause the client device 102 to transmit multiple second beacon requests 226a, 226b to the database proprietor 116 and to the AME 114. The example second beacon requests 226a, 226b may take the form of "session," or non-duration, messages (e.g., referred to herein as V beacons or V pings), duration messages (e.g., referred to herein as D beacons or D pings) and/or quarter-hour messages (e.g., referred to herein as Q beacons or Q pings).

In the example of FIG. 2, V beacons are beacon requests 226a, 226b that are transmitted by the client device 102 when a sufficient duration of the digital audio 206 has been presented at the client device 102 to qualify the presentation as an exposure of the streaming audio (e.g., a "qualified impression" or a session). For example, a sufficient duration is achieved when a duration for which the digital audio 206 has been presented satisfies a session duration threshold (e.g., thirty seconds). In some examples, when the sufficient duration of the digital audio 206 has been presented (e.g., a qualified session of the digital audio 206 has occurred), the example beacon instructions 208 cause the client device 102 to transmit a V beacon to the AME impressions collector 218 and/or to the database proprietor 116, and does not transmit additional V beacons for the same presentation of the digital audio 206. If the sufficient duration is not presented, the impression is not qualified, and the V beacon is not transmitted (e.g., the impression is not counted by the audience data generator 120 as a "session"). The duration of the digital audio that is sufficient to qualify the presentation as a session may depend on the digital audio 206 and/or based on empirical observations about a duration of presentation that correlates to, for example, memory of the digital audio 206 by a listener. Sessions of the digital audio 206 may be calculated based on collecting V beacons and determining demographic groups to which the V beacons are attributable, as described in more detail below.

In the example of FIG. 2, D beacons are beacon requests 226a, 226b that contain duration information that identify portions of the digital audio 206 (e.g., streaming audio) that has been presented at the client device 102. For example, the D beacons may use the format "D_s_abcde," where s denotes a time segment of a daypart (e.g., a five-minute interval). The s term can vary between 1 and n, with n being the last segment of the daypart. As used herein, a "daypart" represents a measured period of time. For example, a first example daypart may represent the interval between Monday 7:00 AM and Friday 7:00 PM, a second example daypart may represent the interval between Monday 7:00 AM and 5:00 PM, etc. In the D beacon format D_s_abcde, the terms a, b, c, d and e refer to respective ones of 1st, 2nd, 3rd, 4th, and 5th sub-segments (e.g., minutes) of a time segment. A value 0 in any of the terms a, b, c, d, e indicates that the corresponding sub-segment (e.g., the corresponding minute) was not presented and the value 1 indicates that the corresponding sub-segment (e.g., the corresponding minute) was presented. Thus, a D beacon of D_2_01010 indicates that, of a second time segment of a daypart (of n time segments making up the daypart), the 2nd and 4th sub-segments were presented while the 1st, 3rd, and 5th sub-segments were not presented. In the illustrated example, a sufficient duration of a sub-segment is achieved when a duration for which the digital audio 206 has been presented satisfies a sub-segment duration threshold (e.g., thirty seconds).

In some examples, a first D beacon associated with a first time segment is transmitted when the first sub-segment of the first time segment is determined to be presented but before the first time segment concludes and then a second D beacon associated with the first time segment is also transmitted when the first time segment concludes. For example, consider an example in which a user listens to a streaming station for minutes 1-3 and 5 of a five minute time segment but not during minute 4. In some such examples, the client device 102 transmits a first D beacon of D_1_10000 when the duration of the first sub-segment satisfies a sub-segment duration threshold (e.g., thirty seconds) and then transmits a second D beacon of D_1_01101 at the conclusion of the first time segment. In the illustrated example, the first D beacon of D_1_10000 indicates that the first sub-segment (e.g., minute 1) of the first time segment was presented and the second D beacon of D_1_01101 indicates that the 2nd, 3rd and 5th minutes of the first time segment were presented, and the fourth minute of the first time segment was not presented.

In the example of FIG. 2, the client device 102 sends the D beacons at the conclusion of designated time segments (e.g., after the 5th minute of a time segment is presented). As used herein, a "time segment" may refer to the larger segments represented by one D beacon (e.g., super-segments) and/or to a sub-segment (e.g., a minute) that is a component of the larger segment.

In some examples, once a session is initiated (e.g., the client device 102 transmits a V beacon), the client device 102 continues transmitting D beacons until the session is terminated and the respective time segment concludes. In some examples, once a session is initiated (e.g., the client device 102 transmits a V beacon), the client device 102 does not transmit a D beacon if none of the sub-segments of the respective time segment were presented.

In the example of FIG. 2, the client device 102 sends a Q beacon at the conclusion of designated quarter-hour time segments (e.g., after the 15$^{th}$ minute of a daypart). For example, the Q beacons may use the format "Q_r," where r denotes a quarter-hour time segment of a daypart. The r term can vary between 1 and n, with n being the last quarter-hour segment of the daypart. In the example of FIG. 2, a sufficient duration of a quarter-hour time-segment is achieved when a duration for which the digital audio 206 has been presented satisfies a quarter-hour duration threshold (e.g., five minutes).

As an illustrative example, consider an example in which the presentation duration threshold is thirty seconds, the sub-segment duration threshold is thirty seconds, the quarter-hour duration threshold is five minutes, the time segment is five minutes and a daypart represents the interval between Monday 7:00 AM and Friday 7:00 PM. Assuming a user listens to a streaming station continuously from Monday 8:00 AM to Monday 8:24 AM and from Monday 8:41 AM to Monday 9:00 AM, example Table 1 illustrates a mapping of transmission times of I beacons, V beacons, D beacons and Q beacons from the client device 102.

TABLE 1

| Time | I Beacon | V Beacon | D Beacon | Q Beacon |
|---|---|---|---|---|
| 8:00:00 - Start streaming | I beacon | | | |
| 8:00:30 | | V beacon | D_13_10000 | |
| 8:05:00 | | | D_13_01111 | |
| 8:10:00 | | | D_14_11111 | |
| 8:15:00 | | | D_15_11111 | Q_5 |
| 8:20:00 | | | D_16_11111 | |
| 8:24:00 - Pause streaming | | | | |
| 8:25:00 | | | D_17_11110 | |
| 8:30:00 | | | | Q_6 |
| . . . | | | | |
| 8:41:00 - Resume streaming | | | | |
| 8:45:00 | | | D_21_01111 | |
| 8:50:00 | | | D_22_11111 | |
| 8:55:00 | | | D_23_11111 | |
| 9:00:00 - Stop streaming | | | D_24_11111 | Q_8 |

Table 1 illustrates that an I beacon is transmitted when streaming starts at 8:00:00 and a V beacon is transmitted when the session is qualified at 8:00:30. In the example of Table 1, the user pauses playback of the streaming station at 8:25:00 and resumes playback of the streaming station at 8:41:00 and, thus, only one V beacon is transmitted. If, however, the user exited, for example, the application used to access the streaming station at 8:25:00 and then restarted the application at 8:41:00, the client device 102 would transmit a second V beacon at 8:41:30.

Table 1 also illustrates that the time segment 8:00 AM to 8:05 is the 13th time segment of the daypart starting at Monday 7:00 AM and, thus, the client device 102 transmits a D beacon of D_13_10000 at 8:00:30 AM when the first sub-segment of the 13th time segment is presented and continues transmitting D beacons until the conclusion of the 17th time segment during which the user paused streaming of the streaming station. In the illustrated example, no sub-segments are presented between the 18th and the 20th time segments while the user has paused streaming and, thus, no D beacons are transmitted at the conclusion of the respective time segments.

With respect to the Q beacons in the example of Table 1, 8:00 AM to 8:15 AM is the fifth quarter-hour time segment of the daypart and, thus, the client device 102 transmits a Q beacon of Q_5 at the conclusion of the fifth quarter-hour time segment (e.g., 8:15 AM) and a Q beacon of Q_6 at the conclusion of the sixth quarter-hour time segment (e.g., 8:30 AM). In the illustrated example of Table 1, because the user did not listen to the streaming station for the quarter-hour duration threshold (e.g., five minutes) during the seventh quarter-hour time segment (e.g., between 8:30 AM and 8:45 AM), no Q beacon was transmitted at the conclusion of the seventh quarter-hour time segment. In some examples, the format of the Q beacon may be modified to enable indicating whether a respective quarter-hour time segment was presented. In some such examples, Q beacons of Q_5_1, Q_6_1 and Q_8_1 may indicate that the 5th, 6th, and 8th quarter-hour time segments of the daypart were presented while a Q beacon of Q_7_0 may indicate that the 7th quarter-hour time segment of the daypart was not presented.

As discussed below in connection with FIG. 3, the audience data generator 120 determines whether the digital audio 206 is associated with a broadcast station (e.g., where a streaming station (1) has a counterpart over-the-air radio station (sometimes referred to herein as a "radio station" or "OTA station") and (2) the streaming station and the counterpart OTA station have the same ad-load) or is associated with a digital station (e.g., where the streaming station (1) does not have a counterpart over-the-air radio station and/or (2) the streaming station and the counterpart OTA radio station do not have the same ad-load). In the illustrated example, when the audience data generator 120 determines that the digital audio 206 is associated with a broadcast station, the audience data generator 120 discards the V beacons and the D beacons received during playback of the digital audio 206 and logs the Q beacons. In other examples when the audience data generator 120 determines that the digital audio 206 is associated with a digital station, the audience data generator 120 discards the Q beacons received during playback of the digital audio 206 and logs the V beacons and the D beacons.

When the database proprietor 116 receives the device/user identifier 227, the database proprietor 116 can obtain demographic information corresponding to a user of the client device 102 based on the device/user identifier 227 that the database proprietor 116 receives from the client device 102. In some examples, the database proprietor 116 determines (e.g., in accordance with the examples disclosed in U.S. Patent Publication No. 2012/0072469 to Perez et al. and/or U.S. patent application Ser. No. 14/604,394 to Sullivan et al.) a set of classification probabilities associated with the user of the client device 102 to include in the demographic information associated with this user. As described above and in further detail below, the set of classification probabilities represent likelihoods that the user belongs to respective ones of a set of possible demographic classifications (e.g., likelihoods that the panelist belongs to respective ones of a set of possible age groupings, etc.).

Although only a single database proprietor 116 is shown in FIGS. 1 and 2, the impression reporting/collection process of FIGS. 1 and 2 may be implemented using multiple database proprietors. In some such examples, the beacon instructions 208 cause the client device 102 to send beacon/impression requests 226 to numerous database proprietors. For example, the beacon instructions 208 may cause the client device 102 to send the beacon/impression requests 226 to the numerous database proprietors in parallel or in daisy-chain fashion. In some such examples, the beacon instructions 208 cause the client device 102 to stop sending beacon/impression requests 226 to database proprietors once a database proprietor has recognized the client device 102. In other examples, the beacon instructions 208 cause the client device 102 to send beacon/impression requests 226 to database proprietors so that multiple database proprietors can recognize the client device 102 and log a corresponding beacon. Thus, in some examples, multiple database proprietors are provided the opportunity to log beacons and provide corresponding demographics information if the user of the client device 102 is a subscriber of services of those database proprietors.

In some examples, prior to sending the beacon response 222 to the client device 102, the AME impressions collector 218 replaces IDs (e.g., URLs) of media provider(s) that served the digital audio 206 with modified site IDs (e.g., substitute site IDs) which are discernable only by the AME 114 to identify the media provider(s). In some examples, the AME impressions collector 218 may also replace a host website ID (e.g., www.acme.com) with a modified host site ID (e.g., a substitute host site ID) which is discernable only by the AME 114 as corresponding to the host website via which the digital audio 206 is presented. In some examples, the AME impressions collector 218 also replaces the media identifier 213 with a modified media identifier 213 corresponding to the digital audio 206. In this way, the media provider of the digital audio 206, the host website that presents the digital audio 206 and/or the media identifier 213 are obscured from the database proprietor 116, but the database proprietor 116 can still log impressions based on the modified values (e.g., if such modified values are included in the beacon/impression request 226), which can later be deciphered by the AME 114 after the AME 114 receives logged beacons from the database proprietor 116. In some examples, the AME impressions collector 218 does not send site IDs, host site IDS, the media identifier 213 or modified versions thereof in the beacon response 222. In such examples, the client device 102 provides the original, non-modified versions of the media identifier 213, site IDs, host IDs, etc. to the database proprietor 116.

In the illustrated example, the AME impressions collector 218 maintains a modified ID mapping table 228 that maps original site IDs with modified (or substitute) site IDs, original host site IDs with modified host site IDs and/or maps modified media identifiers to original media identifiers, such as the media identifier 213, to obfuscate or hide such information from database proprietors, such as the database proprietor 116. Also in the illustrated example, the AME impressions collector 218 encrypts information received in the beacon/impression request 212 to prevent any intercepting parties from decoding the information. The AME impressions collector 218 of the illustrated example sends the encrypted information in the beacon response 222 to the client device 102 so that the client device 102 can send the encrypted information to the database proprietor 116 in the beacon/impression request 226. In the illustrated example, the AME impressions collector 218 uses an encryption that can be decrypted by the database proprietor 116 site specified in the HTTP "302 Found" re-direct message.

Periodically or aperiodically, the impression data collected by the database proprietor 116 is provided to a DP impressions collector 232 of the AME 114 as, for example, batch data. In some examples, the impression data collected from the database proprietor 116 by the DP impressions collector 232 is demographic impression data, which includes sets of classification probabilities for individuals of a sample population associated with client devices 102 from which beacon requests 226 were received. In some examples, the sets of classification probabilities included in the demographic impression data collected by the DP impressions collector 232 correspond to respective ones of the individuals in the sample population, and may include personal identification information capable of identifying the individuals, or may include obfuscated identification information to preserve the anonymity of individuals who are subscribers of the database proprietor but not panelists of the AME 114. In some examples, the sets of classification probabilities included in the demographic impression data collected by the DP impressions collector 232 correspond to aggregated groups of individuals, which also preserves the anonymity of individuals who are subscribers of the database proprietor.

Additional examples that may be used to implement the beacon instruction processes of FIG. 2 are disclosed in U.S. Pat. No. 8,370,489 to Mainak et al. In addition, other examples that may be used to implement such beacon instructions are disclosed in U.S. Pat. No. 6,108,637 to Blumenau.

In the example of FIG. 2, the AME 114 includes the example audience data generator 120a of FIG. 1 to determine ratings data (e.g., ratings information) using the sets of classification probabilities determined by the AME impressions collector 218 and/or obtained by the DP impressions collector 232. Additionally or alternatively, in the example of FIG. 2, the database proprietor 116 includes the example audience data generator 120b of FIG. 1 to determine digital audio ratings data using the sets of classification probabilities determined by the database proprietor 116. A block diagram of an example audience data generator 120, which may be used to implement one or both of the example audience data generators 120a and/or 120b, is illustrated in FIG. 3.

Figure 3:
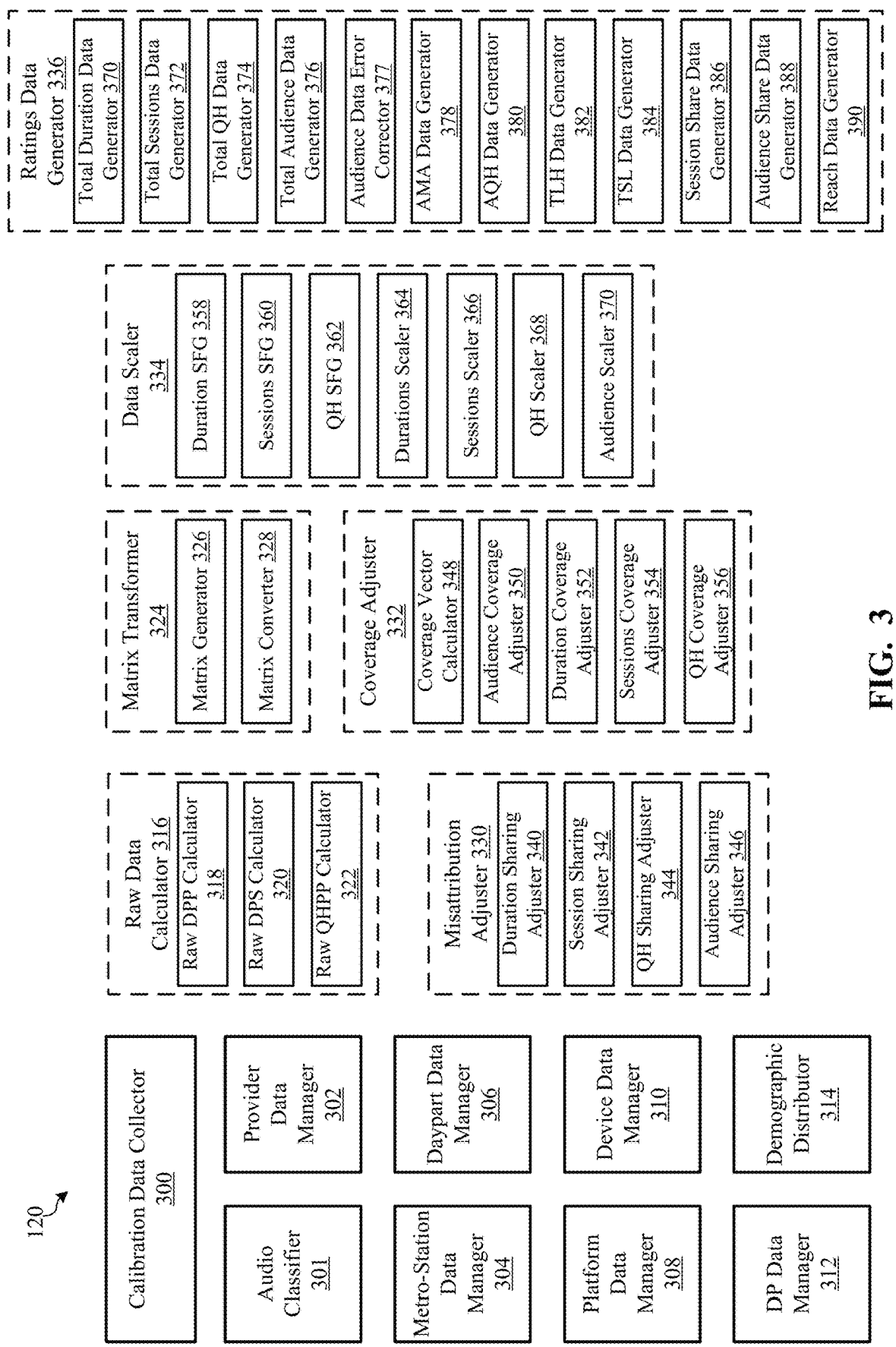
FIG. 3 is a block diagram of an example implementation of the audience data generator of FIGS. 1 and/or 2, which is structured to correct attribution errors and coverage bias for streaming stations in accordance with the teachings of this disclosure.

The example audience data generator 120 of FIG. 3 receives impression information from the AME impressions collector 218. Example impression information includes the beacon/impression requests 212 and/or the beacon/impression requests 226b. The AME impressions collector 218 collects and tracks the requests 212, 226b, as well as the devices 102 from which the requests 212, 226b are received.

The example audience data generator 120 further receives demographic information corresponding to impressions received by the DP 116. In some examples, the impressions received at the DP 116 correspond at least in part to the requests 212, 226b received at the AME impressions collector 218. The example DP 116 attempts to determine demographic information for the impressions (e.g., the beacon/impression requests 226a), and provides numbers of impressions, numbers of sessions, numbers of duration units (e.g., minutes, seconds, etc.), numbers of quarter-hour units and/or numbers of audience members to the AME 114.

In examples disclosed herein, the audience data generator 120 receives aggregated data files containing aggregated numbers of impressions, aggregated numbers of sessions, aggregated numbers of duration units, aggregated numbers of quarter-hour units and aggregated counts of unique audience members organized by groups (e.g., levels of detail) from the DP 116. In examples disclosed herein, the aggregated data files are organized by device type. For example, the DP 116 attributes the aggregated data files to a mobile device such as a smartphone, a tablet, a portable media player (PMP), etc. or a non-mobile device (e.g., a desktop computer). As such, the aggregated data files may indicate whether an audience accessed the digital audio 206 of FIG. 2 via a mobile computing platform (e.g., through a mobile device) or via a non-mobile computing platform (e.g., through a desktop computer). In some examples, the DP 116 may identify ones of the aggregated data files attributed to both the mobile computing platform and the non-mobile computing platform as duplicate data files and attribute the duplicate data files to a total digital computing platform. As such, the aggregated data files are organized by mobile computing platform, non-mobile computing platform, and/or total digital computing platform.

In examples disclosed herein, the aggregated data files are further organized by daypart. As used herein, a daypart represents a measured period of time. For example, a first example daypart may represent the interval between Monday 7 AM and Friday 7 PM, a second example daypart may represent the interval between Monday 7 AM and 5 PM, etc.

In examples disclosed herein, the aggregated data files are further organized by metro-station. As used herein, a metro-station refers to a station and geographic location pairing. For example, a station (e.g., KISS FM) may be accessible in a first geographic location (e.g., Chicago) and also accessible in a second geographic location (e.g., San Francisco). In addition or alternatively, multiple stations may be monitored in a same geographic location. For example, a first station (e.g., KISS FM) and a second station (e.g., ABCD FM) may be monitored in a geographic location (e.g., Chicago). In such instances, it may be beneficial to separate the different geographic location (e.g., metro) and station pairings.

In the example of FIG. 3, the audience data generator 120 receives the aggregated data files from the DP 116 organized by: Provider x Metro x Station x Daypart x profile-corrected demographics (e.g., daypart-level aggregation by provider, metro-station pairing and demographics, such as "Provider 1, Metro 1, Station 1, Daypart 1, Males 18-24" and "Provider 1, Metro 1, Station 1, Daypart 2, Males 25-30"); Provider x Metro x Station x Platform x Daypart x profile-corrected demographics (e.g., platform specific and daypart-level aggregation by provider, metro-station pairing and demographics, such as "Provider 1, Metro 1, Station 1, Platform 1, Daypart 1, Males 18-24" and "Provider 1, Metro 1, Station 1, Platform 2, Daypart 2, Males 25-30"); and Provider x Metro x Station x Platform x Device x Daypart x profile-corrected demographics (e.g., platform and device specific daypart-level aggregation by provider, metro-station pairing and demographics, such as "Provider 1, Metro 1, Station 1, Platform 1, Device 1, Daypart 1, Males 18-24" and "Provider 1, Metro 1, Station 1, Platform 2, Device 2, Daypart 2, Males 25-30").

The example audience data generator 120 includes an example calibration data collector 300. The example calibration data collector 300 collects or obtains survey calibration data describing platform and device usage statistics of an audience. For example, the survey calibration data may include and/or be based on responses to a survey (e.g., a probability survey) of households selected at random. In some examples, a calibration survey obtains information including the demographic characteristics of a panel member (e.g., age and gender, race, ethnicity, language characteristics, household income, geographic location, etc.), the numbers and/or types of devices (e.g., smartphones, tablet computers, portable media players, desktop computer, etc.) used by a panel member, and/or registrations of panel members with specified database proprietors (e.g., DP 116 of FIG. 1). The example calibration data collector 300 obtains the survey calibration data from at least a threshold number of households and, if appropriate, weights the results to be reflective of a general population or audience.

In some other examples, the survey calibration data source includes a survey of established panel(s) of respondents, such as the Nielsen National People Meter (NPM) panel for television ratings. Surveys of established panels often provide higher quality survey calibration data.

The example audience data generator 120 of FIG. 3 includes an example audio classifier 301 to associate digital audio with a broadcast station or a digital station. In the illustrated example of FIG. 3, the audio classifier 301 includes and/or obtains a list of broadcast stations. If digital audio maps to a broadcast station included in the list of broadcast stations, the audio classifier 301 of the illustrated example associates the digital audio with a broadcast station. Otherwise, the audio classifier 301 associated the digital audio with a digital station. However, other techniques for associating digital audio with a broadcast station or a digital station may additionally or alternatively be used.

The example audience data generator 120 of FIG. 3 includes an example provider data manager 302, an example metro-station data manager 304, an example daypart data manager 306, an example platform data manager 308 and an example device data manager 310. The example provider data manager 302, the example metro-station data manager 304, the example daypart data manager 306, the example platform data manager 308 and the example device data manager 310 each manage the aggregated demographic information received from the DP 116 and/or from the AME impressions collector 218 for the respective data levels.

The example audience data generator 120 of FIG. 3 further includes an example DP data manager 312. The example DP data manager 312 collects, stores, and provides the demographic information (e.g., raw impressions, session starts, duration units, quarter-hour units and/or audience data per demographic group and/or data level) obtained from the DP 116. While the provider data manager 302, the metro-station data manager 304, the daypart data manager 306, the platform data manager 308 and the device data manager 310 manage the correction and/or calibration of demographic information obtained from the DP 116 at the respective levels, the example DP data manager 312 manages the raw demographic information obtained from the DP 116 for use in the correction and/or calibration of the demographic information.

The example audience data generator 120 also includes an example demographic distributor 314, an example raw data calculator 316, an example matrix transformer 324, an example misattribution adjuster 330, an example coverage adjuster 332, an example data scaler 334 and an example ratings data generator 336.

In the illustrated example of FIG. 3, the example audience data generator 120 includes the example demographic distributor 314 to determine distributions of impressions, duration units, quarter-hour units and/or audience members by demographic groups. The example demographic distributor 314 may receive communications, notifications, requests, signals, etc. from the provider data manager 302, the metro-station data manager 304, the daypart data manager 306, the platform data manager 308 and/or the device data manager 310 to distribute impressions, duration units, quarter-hour unit and/or audience members into demographic groups (e.g., demographic groups defined by the AME 114 and/or another entity, demographic groups corresponding to an audience measurement system such as digital audio ratings, etc.).

In some examples, the example demographic distributor 314 of FIG. 3 receives as input post-Decision-Tree (DT) daypart-level demographic data from the DP 116 of FIGS. 1 and/or 2 (e.g., via the DP data manager 312). For example, the demographic data may include daypart-level session start counts (rDPSession$_{P,m,x,D,d}$), daypart-level duration unit counts (rDPDuration$_{P,m,x,D,d}$), daypart-level QH unit counts (rDPQH$_{P,m,x,D,d}$) and/or daypart-level unique audience counts (rDPUA$_{P,m,x,D,d}$) that correspond to, for example, a provider (P), a metro-station (m), a device type (x), a daypart (D) and a demographic group (d). The DP 116 aggregates and de-duplicates the session start counts, the duration unit counts, the QH unit counts and/or the unique audience counts for all measured dayparts based on the pings or requests (e.g., V beacons, D beacons and/or Q beacons). In the illustrated example, the session start counts, the duration unit counts, the QH unit counts and/or the unique audience counts are attributed to demographic groups (e.g., females 18-24, males 18-24, etc.) by the DP 116.

In the illustrated example of FIG. 3, the example audience data generator 120 includes the example raw data calculator 316 to calculate raw measures for the demographic groups. The example raw data calculator 316 of FIG. 3 includes an example raw duration per person (DPP) calculator 318, an example raw duration per session (DPS) calculator 320 and an example raw QH per person (QHPP) calculator 322.

In the illustrated example of FIG. 3, the example raw data calculator 316 includes the example raw DPP calculator 318 to calculate a raw duration-per-person (DPP) measure for each demographic group using raw duration unit counts and raw unique audience counts provided by the example demographic distributor 114. In the illustrated example, the raw DPP measure represents the average number of duration units (e.g., minutes) of digital media listened to by a person. For example, the raw DPP calculator 318 may use Equation 1 below to calculate the raw DPP measure.

$$rDPDPP_{P,m,x,D,d} = rDPDuration_{P,m,x,D,d} / rDPUA_{P,m,x,D,d}$$ Equation 1:

In Equation 1 above, the raw DPP measure (rDPDPP$_{P,m,x,D,d}$) is the ratio of the raw number of duration unit counts (rDPDuration$_{P,m,x,D,d}$) for a provider (P), a metro-station (m), a device type (x), a daypart (D) and a demographic group (d), and the raw unique audience counts (rDPUA$_{P,m,x,D,d}$) for the provider (P), the metro-station (m), the device type (x), the daypart (D) and the demographic group (d).

In the illustrated example of FIG. 3, the example raw data calculator 316 includes the example raw DPS calculator 320 to calculate a raw duration-per-session (DPS) measure for each demographic group using raw duration unit counts and raw session start counts provided by the example demographic distributor 114. In the illustrated example, the raw DSP measure represents the number of duration units (e.g., minutes) of digital audio listened to during a session. For example, the raw DPS calculator 320 may use Equation 2 below to calculate the raw DPS measure.

$$rDPDPS_{P,m,x,D,d} = rDPDuration_{P,m,x,D,d} / rDPSession_{P,m,x,D,d}$$ Equation 2:

In Equation 2 above, the raw DPS measure (rDPDPS$_{P,m,x,D,d}$) is the ratio of the raw number of duration unit counts (rDPDuration$_{P,m,x,D,d}$) for a provider (P), a metro-station (m), a device type (x), a daypart (D) and a demographic group (d), and the raw number of session starts (rDPSession$_{P,m,x,D,d}$) for the provider (P), the metro-station (m), the device type (x), the daypart (D) and the demographic group (d).

In the illustrated example of FIG. 3, the example raw data calculator 316 includes the example raw QHPP calculator 322 to calculate a raw quarter-hour-per-person (QHPP) measure for each demographic group using raw QH unit counts and raw unique audience counts provided by the example demographic distributor 114. In the illustrated example, the raw QHPP measure represents the number of QH units (e.g., quarter-hours) of digital audio listened to by a person. For example, the raw QHPP calculator 322 may use Equation 3 below to calculate the raw QHPP measure.

$$rDPQHPP_{P,m,x,D,d} = rDPQH_{P,m,x,D,d} / rDPUA_{P,m,x,D,d}$$ Equation 3:

In Equation 3 above, the raw QHPP measure (rDPQHPP$_{P,m,x,D,d}$) is the ratio of the raw number of QH unit counts (rDPQH$_{P,m,x,D,d}$) for a provider (P), a metro-station (m), a device type (x), a daypart (D) and a demographic group (d), and the raw number of unique audience counts (rDPUA$_{P,m,x,D,d}$) for the provider (P), the metro-station (m), the device type (x), the daypart (D) and the demographic group (d).

In the illustrated example of FIG. 1, the example audience data generator 120 includes the example matrix transformer 324 to facilitate misattribution correction of the demographic data provided by the DP 116. The example matrix transformer 324 of FIG. 3 includes an example matrix generator 326 and example matrix converter 328.

The example matrix transformer 324 of FIG. 3 includes the example matrix generator 326 to generate and/or calculate misattribution adjustment matrices based on survey calibration data. In the illustrated example, the matrix generator 326 creates a misattribution adjustment matrix (M$_{x,DPDemo_i,TrueDemo_j}$) for each device type (x). In the illustrated example, the columns of a misattribution adjustment matrix (M$_{x,DPDemo_i,TrueDemo_j}$) generated by the example matrix generator 326 represent demographic groups (i) identified by the DP 116 (e.g., observed demographic groups) and the rows of the misattribution adjustment matrix represent actual demographic groups (j) of panelists who are actually listening to the digital audio based on the survey calibration data. The example matrix generator 326 receives survey calibration data from the calibration data collector 300 and calculates probabilities that: (1) a person of a recognized demographic group (i) is identified by the database proprietor 116 as a listener of digital audio, and (2) a person in an actual audience demographic group (j) is an actual listener, which is configured using the survey calibration data.

In the illustrated example, each cell of the misattribution adjustment matrices includes a probability that (1) a person of the demographic group (i) is identified by the DP 116 as a listener of the digital audio and (2) a person in the actual demographic group (j) is an actual listener of the digital audio. Thus, when a person is identified by the DP 116 as being a person in the demographic group (i), the actual or true listener is a person in the actual listener demographic group (j), determined from the survey calibration data.

In the illustrated example of FIG. 3, the example matrix transformer 324 includes the example matrix converter 328 to convert the misattribution adjustment matrices from audience count matrices to duration unit count matrices for digital audio 206 associated with digital stations or to QH unit count matrices for digital audio 206 associated with broadcast stations. In examples disclosed herein, the matrix converter 328 utilizes a conversion formula to convert a probability of each cell in the misattribution adjustment matrices to a duration unit count probability.

In examples disclosed herein, the converted misattribution adjustment matrices are used to correct for potential misattribution errors. The example matrix converter 328 uses Equation 4 or Equation 5 below to convert the audience count matrices to duration unit count matrices or to QH unit count matrices, respectively, for each device type (x). For example, the matrix converter 328 converts a misattribution probability of a selected combination of demographic groups (i) and (j) to a duration unit count probability.

$$DM_{P,m,x,D,DPDemo_i,TrueDemo_j} = \\ (M_{x,DPDemo_i,TrueDemo_j} \times rDPDPP_{P,m,x,D,d_j}) \div \\ \sum_{j=1}^{d}(M_{x,DPDemo_i,TrueDemo_j} \times rDPDPP_{P,m,x,D,d_j})$$
Equation 4

$$QHM_{P,m,x,D,DPDemo_i,TrueDemo_j} = \\ (M_{x,DPDemo_i,TrueDemo_j} \times rDPQHPP_{P,m,x,D,d_j}) \div \\ \sum_{j=1}^{d}(M_{x,DPDemo_i,TrueDemo_j} \times rDPQHPP_{P,m,x,D,d_j})$$
Equation 5

In Equation 4 above, the example matrix converter 328 converts the audience count matrices ($M_{x,DPDemo_i,TrueDemo_j}$) for each device type (x) to corresponding duration unit count matrices using the example raw DPP measure ($rDPDPP_{P,m,x,D,d}$) calculated by the example raw DPP calculator 318.

In Equation 5 above, the example matrix converter 328 converts the audience count matrices ($M_{x,DPDemo_i,TrueDemo_j}$) for each device type (x) to corresponding QH unit count matrices using the example raw QHPP measure ($rDPQFPP_{P,m,x,D,d_j}$) calculated by the example raw QHPP calculator 322.

In the illustrated example of FIG. 3, the example audience data generator 120 includes the example misattribution adjuster 330 to calculate sharing-adjusted demographic data. For example, the misattribution adjuster 330 may use the duration unit count matrices and the QH unit count matrices from the example matrix converter 328 to calculate misattribution-adjusted demographic data (e.g., misattribution-adjusted duration unit counts, misattribution-adjusted session counts, misattribution-adjusted QH unit counts and/or misattribution-adjusted unique audience counts). The example misattribution adjuster 330 of FIG. 3 includes an example duration sharing adjuster 340, an example session sharing adjuster 342, an example QH sharing adjuster 344 and an example audience sharing adjuster 346.

The example misattribution adjuster 330 of FIG. 3 includes the example duration sharing adjuster 340 to calculate misattribution-adjusted duration unit counts. The example duration sharing adjuster 340 uses the transformed duration misattribution matrix ($DM_{P,m,x,D,DPDemo_i,TrueDemo_j}$) and the raw DP-provided duration unit counts ($rDPDuration_{P,m,x,D,d}$) to calculate the misattribution-adjusted duration unit counts. For example, the duration sharing adjuster 340 may use Equation 6 below to calculate the misattribution-adjusted duration unit counts.

$$mDuration_{P,m,x,D,d}=DM_{P,m,x,D,DPDemo_i,TrueDemo_j} \times rDPDuration_{P,m,x,D,d}$$
Equation 6:

In Equation 6 above, the example duration sharing adjuster 340 calculates the misattribution-adjusted duration unit counts ($mDuration_{P,m,x,D,d}$) by multiplying the transformed duration misattribution matrix ($DM_{P,m,x,D,DPDemo_i,TrueDemo_j}$) and the raw DP-provided duration unit counts ($rDPDuration_{P,m,x,D,d}$) for each provider (P), metro-station (m), device-type (x), daypart (D) and demographic group (d).

The example misattribution adjuster 330 of FIG. 3 includes the example session sharing adjuster 342 to calculate misattribution-adjusted session unit counts. The example session sharing adjuster 342 uses the misattribution-adjusted duration unit counts ($mDuration_{P,m,x,D,d}$) calculated by the duration sharing adjuster 340 and the raw DPS measure ($rDPDPS_{P,m,x,D,d}$) calculated by the raw DPS calculator 320 to calculate the misattribution-adjusted session counts. For example, the session sharing adjuster 342 may use Equation 7 below to calculate the misattribution-adjusted session counts.

$$mSession_{P,m,x,D,d}=mDuration_{P,m,x,D,d} \div rDPDPS_{P,m,x,D,d}$$
Equation 7:

In Equation 7 above, the example session sharing adjuster 342 calculates the misattribution-adjusted session counts ($mSession_{P,m,x,D,d}$) by multiplying the misattribution-adjusted duration unit counts ($mDuration_{P,m,x,D,d}$) and the raw DPS measure ($rDPDPS_{P,m,x,D,d}$) for each provider (P), metro-station (m), device-type (x), daypart (D) and demographic group (d).

The example misattribution adjuster 330 of FIG. 3 includes the example QH sharing adjuster 344 to calculate misattribution-adjusted QH unit counts. The example QH sharing adjuster 344 uses the transformed QH misattribution matrix ($QHM_{P,m,x,D,DPDemo_i,TrueDemo_j}$) and the raw DP-provided QH unit counts ($rDPQH_{P,m,x,D,d}$) to calculate the misattribution-adjusted QH unit counts. For example, the QH sharing adjuster 344 may use Equation 8 below to calculate the misattribution-adjusted QH unit counts.

$$mQH_{P,m,x,D,d}=QHM_{P,m,x,D,DPDemo_i,TrueDemo_j} \times rDPQH_{P,m,x,D,d}$$
Equation 8:

In Equation 8 above, the example session sharing adjuster 342 calculates the misattribution-adjusted QH unit counts ($mQH_{P,m,x,D,d}$) by multiplying the transformed QH misattribution matrix ($QHM_{P,m,x,D,DPDemo_i,TrueDemo_j}$) and the raw DP-provided QH unit counts ($rDPQH_{P,m,x,D,d}$) for each provider (P), metro-station (m), device-type (x), daypart (D) and demographic group (d).

The example misattribution adjuster 330 of FIG. 3 includes the example audience sharing adjuster 346 to calculate misattribution-adjusted unique audience counts. For example, the audience sharing adjuster 346 may use Equation 9A below to calculate misattribution-adjusted unique audience counts for digital audio 206 associated with digital stations and may use Equation 9B below to calculate misattribution-adjusted unique audience counts for digital audio 206 associated with broadcast stations.

$$mUA_{P,m,x,D,d}=mDuration_{P,m,x,D,d} \div rDPDPP_{P,m,x,D,d}$$
Equation 9A:

$$mUA_{P,m,x,D,d}=mQH_{P,m,x,D,d} \div rDPQHPP_{P,m,x,D,d}$$
Equation 9B:

In Equation 9A above, the example audience sharing adjuster 346 calculates the misattribution-adjusted unique audience counts ($mUA_{P,m,x,D,d}$) as the ratio of the misattribution-adjusted duration unit counts ($mDuration_{P,m,x,D,d}$) and the raw DPP measure ($rDPDPP_{P,m,x,D,d}$) calculated by the example raw DPP calculator 318 for each provider (P), metro-station (m), device-type (x), daypart (D) and demographic group (d).

In Equation 9B above, the example audience sharing adjuster 346 calculates the misattribution-adjusted unique audience counts ($mUA_{P,m,x,D,d}$) as the ratio of the misattribution-adjusted QH unit counts ($mQH_{P,m,x,D,d}$) and the raw QHPP measure ($rDPQHPP_{P,m,x,D,d}$) calculated by the example raw QHPP calculator 322 for each provider (P), metro-station (m), device-type (x), daypart (D) and demographic group (d).

In the illustrated example of FIG. 3, the example audience data generator 120 includes the example coverage adjuster 332 to calculate coverage-adjusted demographic data. For example, the coverage adjuster 332 determines coverage adjustment vectors and applies the coverage adjustment vector to the misattribution-adjusted demographic data calculated by the example misattribution adjuster 330 to determine coverage-adjusted demographic data. In the illustrated example, by applying the coverage adjustment vectors to the misattribution-adjusted demographic data, the potential biases (e.g., misattribution bias and coverage bias) that may be introduced by the DP 116 in the demographic data are corrected. The example coverage adjuster 332 of FIG. 3 includes an example coverage vector calculator 348, an example audience coverage adjuster 350, an example duration coverage adjuster 352, an example sessions coverage adjuster 354 and an example QH coverage adjuster 356 to the coverage-adjusted demographic data.

In the illustrated example of FIG. 3, the example coverage adjuster 332 includes the example coverage vector calculator 348 to calculate coverage vectors for each device type (x). In examples disclosed herein, the coverage vector calculator 348 receives survey calibration data from the calibration data collector 300 and determines a number or portion of persons (e.g., respondents to a survey) in a demographic group that indicate they would be recognized by the database proprietor 116 when using a particular device type (x), as a proportion of the persons in the demographic group that own and have access to that particular device type (x). The coverage vector calculator 348 calculates coverage adjustment vectors (e.g., $C_{P,x,d}$) by determining a total number of respondents in a demographic group with access to a device of the device type (x) and dividing by a covered portion of respondents in the demographic group for the device type (x) based on the survey calibration data.

In the illustrated example of FIG. 3, the example coverage adjuster 332 includes the example audience coverage adjuster 350 to calculate coverage-adjusted unique audience counts. The example audience coverage adjuster 350 uses the misattribution-adjusted unique audience counts ($mUA_{P,m,x,D,d}$) from the example audience sharing adjuster 346 and the coverage adjustment vectors ($C_{P,x,d}$) from the coverage vector calculator 348 to determine the coverage-adjusted unique audience counts for each provider (P), metro-station (m), device type (x), daypart (D) and demographic group (d). For example, the audience coverage adjuster 350 may use Equation 10 below to calculate coverage-adjusted unique audience counts.

$$cUA_{P,m,x,D,d} = mUA_{P,m,x,D,d} \div C_{P,x,d} \quad \text{Equation 10:}$$

In Equation 10 above, the example audience coverage adjuster 350 calculates the coverage-adjusted unique audience counts ($cUA_{P,m,x,D,d}$) as the ratio of the misattribution-adjusted unique audience counts ($mUA_{P,m,x,D,d}$) and a coverage-adjusted vector $C_{P,x,d}$ for the provider (P), device type (x) and demographic group (d).

In the illustrated example of FIG. 3, the example coverage adjuster 332 includes the example duration coverage adjuster 352 to generate coverage-adjusted duration unit counts ($cDuration_{P,m,x,D,d}$). In examples disclosed herein, the example duration coverage adjuster 352 multiplies the coverage-adjusted unique audience counts ($cUA_{P,m,x,D,d}$) from the audience coverage adjuster 350 and the raw DPP measure ($rDPDPP_{P,m,x,D,d}$) calculated by the example raw DPP calculator 318 to generate the coverage-adjusted duration unit counts ($cDuration_{P,m,x,D,d}$) For example, the duration coverage adjuster 352 may use Equation 11 below to calculate the coverage-adjusted duration unit counts ($cDuration_{P,m,x,D,d}$).

$$cDuration_{P,m,x,D,d} = cUA_{P,m,x,D,d} \times rDPDPP_{P,m,x,D,d} \quad \text{Equation 11:}$$

In the illustrated example of FIG. 3, the example coverage adjuster 332 includes the example sessions coverage adjuster 354 to generate coverage-adjusted session start counts ($cSessions_{P,m,x,D,d}$). In examples disclosed herein, the example sessions coverage adjuster 354 calculates a ratio of the coverage-adjusted duration unit counts ($cDuration_{P,m,x,D,d}$) to the raw DPS measure ($rDPDPS_{P,m,x,D,d}$) calculated by the raw DPS calculator 320 to determine the coverage-adjusted session start counts ($cSessions_{P,m,x,D,d}$). For example, the sessions coverage adjuster 354 may use Equation 12 below to calculate the coverage-adjusted sessions start counts ($cSessions_{P,m,x,D,d}$).

$$cSessions_{P,m,x,D,d} = cDuration_{P,m,x,D,d} \div rDPDPS_{P,m,x,D,d} \quad \text{Equation 12:}$$

In the illustrated example of FIG. 3, the example coverage adjuster 332 includes the example QH coverage adjuster 356 to generate coverage-adjusted QH unit counts ($cQH_{P,m,x,D,d}$) In examples disclosed herein, the example QH coverage adjuster 356 multiplies the coverage-adjusted unique audience counts ($cUA_{P,m,x,D,d}$) from the audience coverage adjuster 350 and the raw QHPP measure ($rDPQHPPP_{P,m,x,D,d}$) calculated by the example raw QHPP calculator 322 to generate the coverage-adjusted QH unit counts ($cQH_{P,m,x,D,d}$) For example, the QH coverage adjuster 356 may use Equation 13 below to calculate the coverage-adjusted QH unit counts ($cQH_{P,m,x,D,d}$).

$$cQH_{P,m,x,D,d} = cUA_{P,m,x,D,d} \times rDPQHPP_{P,m,x,D,d} \quad \text{Equation 13:}$$

In the illustrated example of FIG. 3, the example audience data generator 120 includes the example data scaler 334 to scale the misattribution and coverage corrected demographic data generated by the example coverage adjuster 332. The example data scaler 334 uses aggregated numbers of duration units, aggregated numbers of session starts and aggregated numbers of QH units (e.g., census counts) to determine respective scaling factors and then applies the respective scaling factors to the respective coverage-adjusted demographic data to generated scaled demographic data. The example data scaler 334 of FIG. 3 includes an example durations scaling factor generator (SFG) 358, an example sessions SFG 360, an example QH SFG 362, an example durations scaler 364, an example sessions scaler 366, an example QH scalar 368 and an example audience scaler 369.

The example data scaler 334 of FIG. 3 includes the durations SFG 358 to determine a durations scaling factor. The example durations SFG 358 obtains and/or receives the aggregated numbers of duration units (SCDuration$_{P,m,x,D}$) from the aggregated data files received by the audience data generator 120. In the illustrated example, the aggregated number of duration units (SCDuration$_{P,m,x,D}$) is determined at the provider (P), metro-station (m), device type (x) and daypart (D) level. For example, the aggregated number of duration units (SCDuration$_{P,m,x,D}$) represents a total number of duration units across all demographic groups (d).

In examples disclosed herein, the durations SFG 358 determines duration scaling factors (DSF$_{P,m,x,D}$) for each demographic group, at the daypart-level, by dividing the aggregated numbers of duration units (SCDuration$_{P,m,x,D}$) by a sum of the coverage-adjusted duration unit counts (cDuration$_{P,m,x,D,d}$) across all demographic groups (d) at the provider (P), metro-station (m) and device type (x) level. For example, the durations SFG 358 may use Equation 14 below to calculate the duration scaling factors (DSF$_{P,m,x,D}$).

$$DSF_{P,m,x,D} = SCDuration_{P,m,x,D} \div \Sigma_{d=1}^{n} cDuration_{P,m,x,D,d} \quad \text{Equation 14:}$$

In Equation 14 above, the variable (n) represents the number of demographic groups (d).

The example data scaler 334 of FIG. 3 includes the sessions SFG 360 to determine a session scaling factor. The example sessions SFG 360 obtains and/or receives the aggregated numbers of sessions starts (SCSession$_{P,m,x,D}$) from the aggregated data files received by the audience data generator 120. In the illustrated example, the aggregated number of session starts (SCSession$_{P,m,x,D}$) is determined at the provider (P), metro-station (m), device type (x) and daypart (D) level. For example, the aggregated number of session starts (SCSession$_{P,m,x,D}$) represents a total number of session starts across all demographic groups (d).

In examples disclosed herein, the sessions SFG 360 determines sessions scaling factors (SSF$_{P,m,x,D}$) for each demographic group, at the daypart-level, by dividing the aggregated numbers of session starts units (SCSession$_{P,m,x,D}$) by a sum of the coverage-adjusted session start counts (cSession$_{P,m,x,D,d}$) across all demographic groups (d) at the provider (P), metro-station (m) and device type (x) level. For example, the sessions SFG 360 may use Equation 15 below to calculate the sessions scaling factors (SSF$_{P,m,x,D}$).

$$SSF_{P,m,x,D} = SCSession_{P,m,x,D} \div \Sigma_{d=1}^{n} cSessions_{P,m,x,D} \quad \text{Equation 15:}$$

In Equation 15 above, the variable (n) represents the number of demographic groups (d).

The example data scaler 334 of FIG. 3 includes the QH SFG 362 to determine a QH scaling factor. The example QH SFG 362 obtains and/or receives the aggregated numbers of QH units (SCQH$_{P,m,x,D}$) from the aggregated data files received by the audience data generator 120. In the illustrated example, the aggregated number of QH units (SCQH$_{P,m,x,D}$) is determined at the provider (P), metro-station (m), device type (x) and daypart (D) level. For example, the aggregated number of QH units (SCQH$_{P,m,x,D}$) represents a total number of QH units across all demographic groups (d).

In examples disclosed herein, the QH SFG 362 determines QH scaling factors (QHSF$_{P,m,x,D}$) for each demographic group, at the daypart-level, by dividing the aggregated numbers of QH units (SCQH$_{P,m,x,D}$) by a sum of the coverage-adjusted QH unit counts (cQH$_{P,m,x,D,d}$) across all demographic groups (d) at the provider (P), metro-station (m) and device type (x) level. The QH SFG 362 may use Equation 16 below to calculate the QH scaling factors (QHSF$_{P,m,x,D}$).

$$QHSF_{P,m,x,D} = SCQH_{P,m,x,D} \div \Sigma_{d=1}^{n} cQH_{P,m,x,D,d} \quad \text{Equation 16:}$$

In Equation 16 above, the variable (n) represents the number of demographic groups (d).

The example data scaler 334 of FIG. 3 includes the duration scaler 364 to determine scaled duration unit counts (sDuration$_{P,m,x,D,d}$). In examples disclosed herein, the duration scaler 364 receives the duration scaling factors (DSF$_{P,m,x,D}$) from the duration scaling factor generator 358 and multiplies, for each demographic group at the daypart-level, the coverage adjusted duration unit counts (cDuration$_{P,m,x,D,d}$) from the example coverage adjuster 332 by a corresponding duration scaling factor (DSF$_{P,m,x,D}$) to generate scaled duration unit counts (sDuration$_{P,m,x,D,d}$). For example, the duration scaler 364 may use Equation 17 below to calculate the scaled duration unit counts (sDuration$_{P,m,x,D,d}$).

$$sDuration_{P,m,x,D,d} = cDuration_{P,m,x,D,d} \times DSF_{P,m,x,D} \quad \text{Equation 17:}$$

The example data scaler 334 of FIG. 3 includes the sessions scaler 366 to determine scaled sessions start counts (sSession$_{P,m,x,D,d}$). In examples disclosed herein, the sessions scaler 366 receives the sessions scaling factors (SSF$_{P,m,x,D}$) from the sessions scaling factor generator 360 and multiplies, for each demographic group at the daypart-level, the coverage adjusted session start counts (cSession$_{P,m,x,D,d}$) from the example coverage adjuster 332 by a corresponding sessions scaling factor (SSF$_{P,m,x,D}$) to generate scaled session start counts (sSession$_{P,m,x,D,d}$). For example, the sessions scaler 366 may use Equation 18 below to calculate the scaled sessions start counts (sSession$_{P,m,x,D,d}$).

$$sSession_{P,m,x,D,d} = cSession_{P,m,x,D,d} \times SSF_{P,m,x,D} \quad \text{Equation 18:}$$

The example data scaler 334 of FIG. 3 includes the QH scaler 368 to determine scaled QH unit counts (sQH$_{P,m,x,D,d}$) In examples disclosed herein, the QH scaler 368 receives the QH scaling factors (QHSF$_{P,m,x,D}$) from the QH scaling factor generator 362 and multiplies, for each demographic group at the daypart-level, the coverage adjusted QH unit counts (cQH$_{P,m,x,D,d}$) from the example coverage adjuster 332 by a corresponding QH scaling factor (QHSF$_{P,m,x,D}$) to generate scaled QH unit counts (sQH$_{P,m,x,D,d}$) For example, the QH scaler 368 may use Equation 19 below to calculate the scaled QH unit counts (sQH$_{P,m,x,D,d}$).

$$sQH_{P,m,x,D,d} = cQH_{P,m,x,D,d} \times QHSF_{P,m,x,D} \quad \text{Equation 19:}$$

The example data scaler 334 of FIG. 3 includes the audience scaler 369 to determine scaled unique audience counts (sUA$_{P,m,x,D,d}$). In examples disclosed herein, the audience scaler 369 calculates scaled unique audience counts for digital audio 206 that is associated with a digital station as a ratio of the scaled duration unit counts (sDuration$_{P,m,x,D,d}$) and the raw DPP measure (rDPDPP$_{P,m,x,D,d}$) from the example raw DPP calculator 318. For example, the audience scaler 369 may use Equation 20A below to determine the scaled unique audience counts for digital audio 206 associated with a digital station.

$$sUA_{P,m,x,D,d} = sDuration_{P,m,x,D,d} \div rDPDPP_{P,m,x,D,d} \quad \text{Equation 20A:}$$

In examples disclosed herein, the audience scaler 369 calculates scaled unique audience counts for digital audio 206 that is associated with a broadcast station as a ratio of the scaled QH unit counts (sQH$_{P,m,x,D,d}$) and the raw QHPP measure (rDPQHPP$_{P,m,x,D,d}$) from the example raw QHPP calculator 322. For example, the audience scaler 369 may use Equation 20B below to determine the scaled unique audience counts for digital audio 206 associated with a broadcast station.

$$sUA_{P,m,x,D,d} = sQH_{P,m,x,D,d} \div rQHPP_{P,m,x,D,d} \qquad \text{Equation 20B:}$$

In the illustrated example of FIG. 3, the example audience data generator 120 includes the example ratings data generator 336 to generate ratings information for digital audio of interest for the demographic groups across all device devices (e.g., total digital ratings information). For example, the ratings data generator 336 may determine numbers of sessions, duration unit counts, quarter-hour unit counts, unique audience, average minute audience (AMA), average quarter-hour (AQH), total listening hours (TLH), time-spent listening (TSL), session starts share, audience share and/or audience reach for the one or more demographic groups at the daypart level. The example ratings data generator 336 includes an example total duration data generator 370, an example total session data generator 372, an example total QH data generator 374, an example total audience data generator 376, an example audience data error corrector 377, an example AMA data generator 378, an example AQH data generator 380, an example TLH data generator 382, an example TSL data generator 384, an example session share data generator 386, an example audience share data generator 388 and an example reach data generator 390.

The example total duration data generator 370 of the illustrated example of FIG. 3 determines a total duration unit count (Duration$_{P,m,x,D}$) across all device types (x) (e.g., mobile devices and non-mobile devices). For example, the total duration data generator 370 may use Equation 21 below to calculate the total duration unit count (Duration$_{P,m,x,D}$) for a provider (P), metro-station (m), daypart (D) and demographic group (d).

$$\text{Duration}_{P,m,x,D} = \Sigma_{x=1}^{n} s\text{Duration}_{P,m,x,D,d} \qquad \text{Equation 21:}$$

In Equation 21 above, the variable (n) represents the total number of device types. In some examples, the total duration data generator 370 calculates the total duration unit count (Duration$_{P,m,x,D}$) using data for a first period (e.g., at weekly level) and reports a total duration unit count over a second period. In some such examples, the total duration data generator 370 may generate the reported total duration unit count by determining an average of previously calculated total duration unit counts. For example, the total duration data generator 370 may calculate the total duration unit count on a weekly basis, and generate a reported total duration unit count by determining the average of four calculated total duration unit counts.

The example total session data generator 372 of the illustrated example of FIG. 3 determines a total session starts count (Session$_{P,m,x,D}$) across all device types (x) (e.g., mobile devices and non-mobile devices). For example, the total session data generator 372 may use Equation 22 below to calculate the total session starts count (Session$_{P,m,x,D}$) for a provider (P), metro-station (m), daypart (D) and demographic group (d).

$$\text{Session}_{P,m,D,d} = \Sigma_{x=1}^{n} s\text{Session}_{P,m,x,D,d} \qquad \text{Equation 22:}$$

In Equation 22 above, the variable (n) represents the total number of device types. In some examples, the total session data generator 372 calculates the total session starts count (Session$_{P,m,x,D}$) using data for a first period (e.g., at weekly level) and reports a total sessions start count over a second period. In some such examples, the total session data generator 372 may generate the reported total session starts count by determining an average of previously calculated total sessions starts counts. For example, the total session data generator 372 may calculate the total sessions starts count on a weekly basis, and generate a reported total sessions starts count by determining the average of four previously calculated total sessions starts counts.

The example total QH data generator 374 of the illustrated example of FIG. 3 determines a total QH unit count (QH$_{P,m,x,D}$) across all device types (x) (e.g., mobile devices and non-mobile devices). For example, the total QH data generator 374 may use Equation 23 below to calculate the total QH unit count (QH$_{P,m,x,D}$) for a provider (P), metro-station (m), daypart (D) and demographic group (d).

$$QH_{P,m,D,d} = \Sigma_{x=1}^{n} sQH_{P,m,x,D,d} \qquad \text{Equation 23:}$$

In Equation 23 above, the variable (n) represents the total number of device types. In some examples, the total QH data generator 374 calculates the total QH unit count (QH$_{P,m,x,D}$) using data for a first period (e.g., at weekly level) and reports a total QH unit count over a second period. In some such examples, the total QH data generator 374 may generate the reported total QH unit count by determining an average of previously calculated total QH unit counts. For example, the total QH data generator 374 may calculate the total QH unit count on a weekly basis, and generate a reported total QH unit count by determining the average of four previously calculated total QH unit counts.

The example total audience data generator 376 of the illustrated example of FIG. 3 determines a total unique audience count (UA$_{P,m,x,D,d}$) across all device types (x) (e.g., mobile devices and non-mobile devices). For example, the total audience data generator 376 may use Equation 24A or Equation 24B below to calculate the total unique audience count (Audience$_{P,m,D,d}$) for a provider (P), metro-station (m), daypart (D) and demographic group (d). In the illustrated example, the total audience data generator 376 uses Equation 24A when generating a total unique audience count for digital audio that is associated with a digital station and uses Equation 24B when the digital audio that is associated with a broadcast station.

$$UA_{P,m,D,d} = \text{Duration}_{P,m,D,d} \div rDPDPP_{P,m,D,d} \qquad \text{Equation 24A:}$$

$$UA_{P,m,D,d} = QH_{P,m,D,d} \div rDPQHPP_{P,m,D,d} \qquad \text{Equation 24B:}$$

In Equation 24A above, the total unique audience count (UA$_{P,m,x,D}$) for digital audio that is associated with a digital station is calculated as a ratio of the total duration unit count (Duration$_{P,m,D,d}$) and the raw DP-provided DPP measure (rDPDPP$_{P,m,D,d}$) (e.g., from the example raw DPP calculator 318). In Equation 24B above, the total unique audience count (UA$_{P,m,x,D,d}$) for digital audio that is associated with a digital station is calculated as a ratio of the total duration unit count (QH$_{P,m,x,D}$) and the raw DP-provided QHPP measure (rDPQHPP$_{P,m,D,d}$) (e.g., from the example raw QHPP calculator 322). In the illustrated example, the total audience data generator 376 rounds the total unique audience count (UA$_{P,m,x,D}$) to the nearest 100 when reporting the total unique audience count (UA$_{P,m,x,D}$). In some examples, the total audience data generator 376 calculates the total unique audience count on a weekly basis, and generates a reported total unique audience count by determining the average of four previously calculated total unique audience counts.

The example audience data error corrector 377 of the illustrated example of FIG. 3 identifies and, where applicable, corrects errors in the unique audience counts. For example, if the unique audience for a provider (P) is greater than the number of duration unit counts (e.g., resulting in greater than 1 duration unit (e.g., one minute) per identified audience member) for a digital station, or greater than the number of QH unit counts (e.g., resulting in greater than 1 QH unit per identified audience member) for a broadcast station, the audience data error corrector 377 corrects the unique audience count (e.g., by setting the unique audience count to be equal to or less than the number of duration unit counts/QH unit counts).

The example AMA data generator 378 of the illustrated example of FIG. 3 determines an average minute audience for digital audio that is that is associated with a digital station. The example AMA data generator 378 of FIG. 3 generates the AMA by calculating the ratio of the total duration unit counts (Duration$_{P,m,D,d}$) and the number of duration units in the daypart (H$_d$). For example, if a daypart (D) is Monday 7 AM-10 AM and the duration unit is one minute, then the number of duration units in the daypart (H$_d$) is 180 (e.g., 3 hours*60 minutes/hour/1 minute). In some examples, the AMA data generator 378 may use Equation 25 below to calculate the AMA for a provider (P), metro-station (m), daypart (D) and demographic group (d).

$$AMA_{P,m,D,d} = \text{Duration}_{P,m,D,d} \div H_D \quad \text{Equation 25:}$$

In the illustrated example of FIG. 3, the example AMA data generator 378 rounds the calculated AMA to the nearest 100. In some examples, the AMA data generator 378 calculates the AMA on a weekly basis, and generates a reported AMA by determining the average of four previously calculated AMA values.

The example AQH data generator 380 of the illustrated example of FIG. 3 determines an average quarter-hour (AQH) for digital audio that is that is associated with a broadcast station. The example AQH data generator 380 of FIG. 3 generates the AQH by calculating the ratio of the total QH unit counts (QH$_{P,m,D,d}$) and the number of quarter-hours in the daypart (H$_d$). For example, if a daypart (D) is Monday 7 AM-10 AM, then the number of quarter-hours in the daypart (H$_d$) is 12 (e.g., 3 hours*4 quarter-hours/hour). In some examples, the AMA data generator 378 may use Equation 26 below to calculate the AQH for a provider (P), metro-station (m), daypart (D) and demographic group (d).

$$AQH_{P,m,D,d} = QH_{P,m,D,d} \div H_D \quad \text{Equation 26:}$$

In the illustrated example of FIG. 3, the example AQH data generator 380 rounds the calculated AQH to the nearest 100. In some examples, the AQH data generator 380 calculates the AQH on a weekly basis, and generates a reported AQH by determining the average of four previously calculated AQH values.

The example TLH data generator 382 of the illustrated example of FIG. 3 determines the total listening hours (TLH) for a provider (P), a metro-station (m), daypart (D) and demographic group (d) across all device types (x). In the illustrated example, the TLH data generator 382 calculates the TLH by dividing the total duration unit count (Duration$_{P,m,D,d}$) by 60 (e.g., the number of minutes in an hour) when the digital audio is associated with a digital station. The example TLH data generator 382 calculates the TLH for digital audio associated with a broadcast station by dividing the total QH unit counts by 4 (e.g., the number of quarter-hours in an hour). For example, the TLH data generator 382 may use Equation 27A below to calculate the TLH for digital audio associated with a digital station and uses Equation 27B below to calculate the TLH for digital audio associated with a broadcast station.

$$TLH_{P,m,D,d} = \text{Duration}_{P,m,D,d}/60 \quad \text{Equation 27A:}$$

$$TLH_{P,m,D,d} = QH_{P,m,D,d}/4 \quad \text{Equation 27B:}$$

In the illustrated example of FIG. 3, the example TLH data generator 382 rounds the calculated TLH to the nearest 100. In some examples, the TLH data generator 382 calculates the TLH on a weekly basis, and generates a reported TLH by determining the average of four previously calculated TLH values.

The example TSL data generator 384 of the illustrated example of FIG. 3 determines the time-spent listening (TSL) for a provider (P), a metro-station (m), daypart (D) and demographic group (d) across all device types (x). In the illustrated example, the TSL data generator 384 generates the TSL by calculating a ratio of the total listening hours (TLH$_{P,m,x,D}$) generated by the example TLH data generator 382 and total unique audience count (UA$_{P,m,D,d}$). For example, the TSL data generator 384 may use Equation 28 below to calculate the time-spent listening.

$$TSL_{P,m,D,d} = TLH_{P,m,D,d}/UA_{P,m,D,d} \quad \text{Equation 28:}$$

In the illustrated example of FIG. 3, the TSL is expressed in hours and the example TSL data generator 384 rounds the calculated TSL to the nearest quarter-hour. In some examples, the TSL data generator 384 calculates the TSL on a weekly basis, and generates a reported TSL by determining the average of four previously calculated TSL values.

The example session share data generator 386 of the illustrated example of FIG. 3 determines a session starts share (SSShare$_{P,m,x,D}$) for a provider (P), metro-station (m), daypart (D) and demographic group (d) across all device types (x) (e.g., total digital). In the illustrated example of FIG. 3, the session starts share (SSShare$_{P,m,D,d}$) corresponds to the percentage of a session that is represented by a demographic group (d). For example, the session share data generator 386 may use Equation 29 below to calculate the session starts share (SSShare$_{P,m,x,D}$).

$$SSShare_{P,m,D,d} = (\text{Sessions}_{P,m,D,d}/\Sigma_{d=1}^{j} \text{Sessions}_{P,m,D,d}) \times 100 \quad \text{Equation 29:}$$

In the illustrated example, the variable (j) represents the number of demographic groups within the daypart. In the illustrated example, the session share data generator 386 calculates a session starts share (SSShare$_{P,m,D,d}$) for digital audio associated with a digital station, but not for digital audio associated with a broadcast station.

The example audience share data generator 388 of the illustrated example of FIG. 3 determines an audience share (UAShare$_{P,m,x,D}$) for total digital (e.g., across all device types (x)) for a provider (P), a metro-station (m), a daypart (D) and a demographic group (d). In the illustrated example, the audience share (UAShare$_{P,m,x,D}$) represents the demographic composition of each audience. For example, the audience share data generator 388 may use Equation 30 below to calculate the audience share (UAShare$_{P,m,x,D}$).

$$UAShare_{P,m,D,d} = (UA_{P,m,D,d}/\Sigma_{d=1}^{j} UA_{P,m,D,d}) \times 100 \quad \text{Equation 30:}$$

In the illustrated example, the variable (j) represents the number of demographic groups within the daypart. In the illustrated example, the audience share data generator 388 calculates an audience share (UAShare$_{P,m,x,D}$) for digital audio associated with a digital station, but not for digital audio associated with a broadcast station.

The example reach data generator 390 of the illustrated example of FIG. 3 determines audience reach (Reach$_{P,m,x,D}$)

for total digital (e.g., across all device types (x)) for a provider (P), a metro-station (m), a daypart (D) and a demographic group (d). For example, the audience reach ($Reach_{P,m,x,D}$) may be based on the total unique audience count ($UA_{P,m,x,D}$) and a base population ($PopBase_d$) for the demographic group (d). For example, the reach data generator 390 may use Equation 31 below to calculate the audience reach ($Reach_{P,m,x,D}$).

$$Reach_{P,m,D,d}=(UA_{P,m,D,d}/PopBase_d)\times100 \quad \text{Equation 31:}$$

In the illustrated example, the audience share data generator 388 calculates an audience share ($UAShare_{P,m,x,D}$) for digital audio associated with a digital station, but not for digital audio associated with a broadcast station.

While an example manner of implementing the audience data generator 120 of FIGS. 1 and/or 2 is illustrated in FIG. 3, one or more of the elements, processes and/or devices illustrated in FIG. 3 may be combined, divided, re-arranged, omitted, eliminated and/or implemented in any other way. Further, the example calibration data collector 300, the example audio classifier 301, the example provider data manager 302, the example metro-station data manager 304, the example daypart data manager 306, the example platform data manager 308, the example device data manager 310, the example DP data manager 312, the example demographic distributor 314, the example raw data calculator 316, the example raw DPP calculator 318, the example raw DPS calculator 320, the example raw QHPP calculator 322, the example matrix transformer 324, the example matrix generator 326, the example matrix converter 328, the example misattribution adjuster 330, the example coverage adjuster 332, the example data scaler 334, the example ratings data generator 334, the example duration sharing adjuster 340, the example session sharing adjuster 342, the example QH sharing adjuster 344, the example audience sharing adjuster 346, the example coverage vector calculator 348, the example audience coverage adjuster 350, the example duration coverage adjuster 352, the example sessions coverage adjuster 354, the example QH coverage adjuster 356, the example duration SFG 358, the example sessions SFG 360, the example QH SFG 362, the example durations scaler 364, the example sessions scaler 366, the example QH scaler 368, the example audience scaler 369, the example total duration data generator 370, the example total session data generator 372, the example total QH data generator 374, the example total audience data generator 376, the example audience data error corrector 377, the example AMA data generator 378, the example AQH data generator 380, the example TLH data generator 382, the example TSL data generator 384, the example session share data generator 386, the example audience share data generator 388, the example reach data generator 390 and/or, more generally, the example audience data generator 120 of FIGS. 1, 2 and/or 3 may be implemented by hardware, software, firmware and/or any combination of hardware, software and/or firmware. Thus, for example, any of the example calibration data collector 300, the example audio classifier 301, the example provider data manager 302, the example metro-station data manager 304, the example daypart data manager 306, the example platform data manager 308, the example device data manager 310, the example DP data manager 312, the example demographic distributor 314, the example raw data calculator 316, the example raw DPP calculator 318, the example raw DPS calculator 320, the example raw QHPP calculator 322, the example matrix transformer 324, the example matrix generator 326, the example matrix converter 328, the example misattribution adjuster 330, the example coverage adjuster 332, the example data scaler 334, the example ratings data generator 334, the example duration sharing adjuster 340, the example session sharing adjuster 342, the example QH sharing adjuster 344, the example audience sharing adjuster 346, the example coverage vector calculator 348, the example audience coverage adjuster 350, the example duration coverage adjuster 352, the example sessions coverage adjuster 354, the example QH coverage adjuster 356, the example duration SFG 358, the example sessions SFG 360, the example QH SFG 362, the example durations scaler 364, the example sessions scaler 366, the example QH scaler 368, the example audience scaler 369, the example total duration data generator 370, the example total session data generator 372, the example total QH data generator 374, the example total audience data generator 376, the example audience data error corrector 377, the example AMA data generator 378, the example AQH data generator 380, the example TLH data generator 382, the example TSL data generator 384, the example session share data generator 386, the example audience share data generator 388, the example reach data generator 390 and/or, more generally, the example audience data generator 120 of FIGS. 1, 2 and/or 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example calibration data collector 300, the example audio classifier 301, the example provider data manager 302, the example metro-station data manager 304, the example daypart data manager 306, the example platform data manager 308, the example device data manager 310, the example DP data manager 312, the example demographic distributor 314, the example raw data calculator 316, the example raw DPP calculator 318, the example raw DPS calculator 320, the example raw QHPP calculator 322, the example matrix transformer 324, the example matrix generator 326, the example matrix converter 328, the example misattribution adjuster 330, the example coverage adjuster 332, the example data scaler 334, the example ratings data generator 334, the example duration sharing adjuster 340, the example session sharing adjuster 342, the example QH sharing adjuster 344, the example audience sharing adjuster 346, the example coverage vector calculator 348, the example audience coverage adjuster 350, the example duration coverage adjuster 352, the example sessions coverage adjuster 354, the example QH coverage adjuster 356, the example duration SFG 358, the example sessions SFG 360, the example QH SFG 362, the example durations scaler 364, the example sessions scaler 366, the example QH scaler 368, the example audience scaler 369, the example total duration data generator 370, the example total session data generator 372, the example total QH data generator 374, the example total audience data generator 376, the example audience data error corrector 377, the example AMA data generator 378, the example AQH data generator 380, the example TLH data generator 382, the example TSL data generator 384, the example session share data generator 386, the example audience share data generator 388, the example reach data generator 390 and/or, more generally, the example audience data generator 120 of FIGS. 1, 2 and/or 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example audience data generator 120 of FIGS. 1, 2 and/or 3 may include one or more elements, processes and/or devices in addition to, or instead of, those illustrated in FIG. 3, and/or may include more than one of any or all of the illustrated elements, processes and devices.

Flowcharts representative of example machine readable instructions for implementing the example audience data generator 120 of FIGS. 1, 2 and/or 3 are shown in FIGS. 4-8 and/or 9. In this example, the machine readable instructions comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 4-8 and/or 9, many other methods of implementing the example audience data generator 120 may alternatively be used. For example, the order of execution of the blocks may be changed, and/or some of the blocks described may be changed, eliminated, or combined.

As mentioned above, the example processes of FIGS. 4-8 and/or 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-8 and/or 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. "Comprising" and all other variants of "comprise" are expressly defined to be open-ended terms. "Including" and all other variants of "include" are also defined to be open-ended terms. In contrast, the term "consisting" and/or other forms of "consist" are defined to be close-ended terms.

Figure 4:
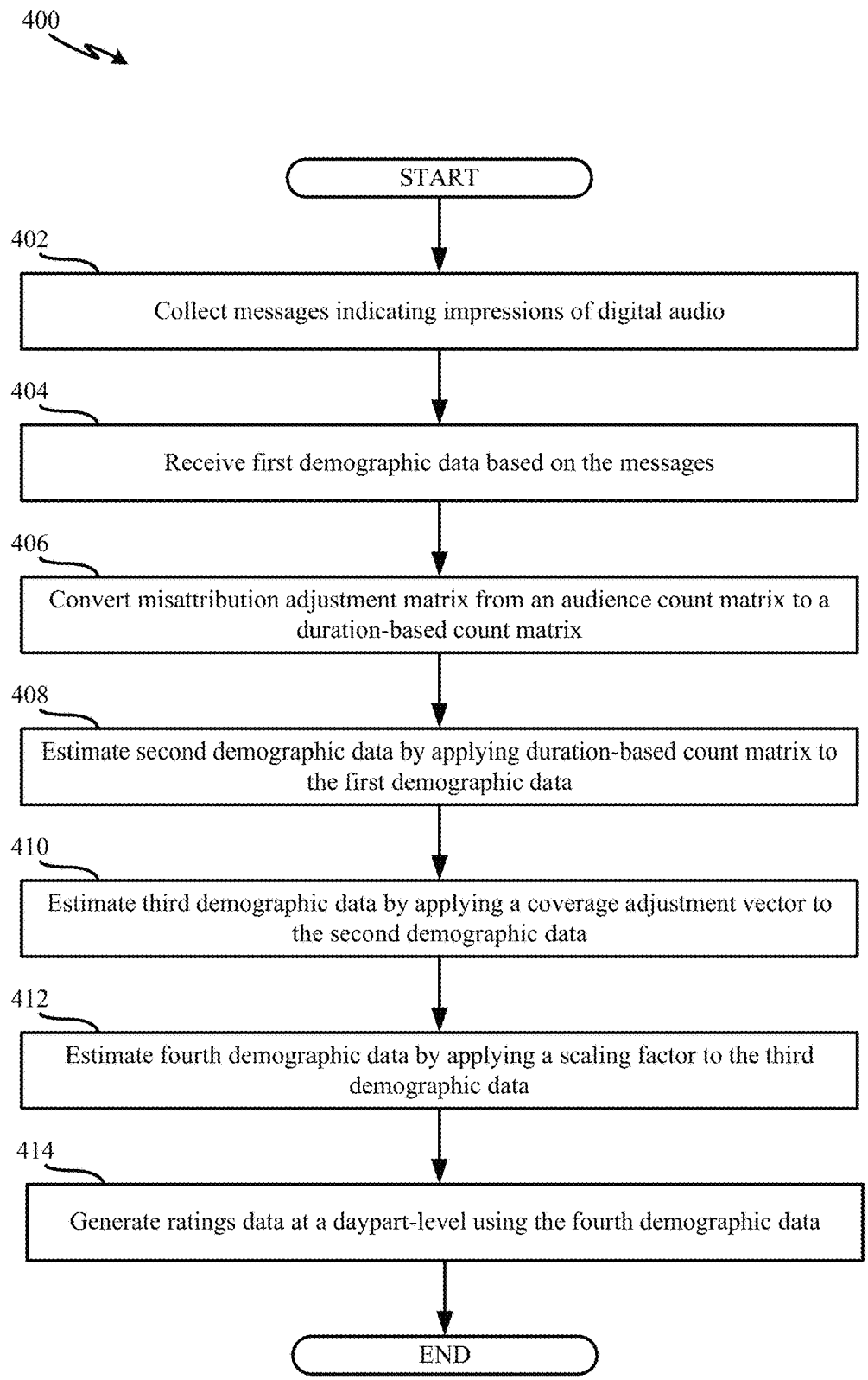
FIGS. 4-9 are flowcharts representative of example machine-readable instructions that may be executed by the example audience data generator of FIGS. 1, 2 and/or 3 to generate digital audio ratings information.

FIG. 4 is a flowchart representative of example machine-readable instructions 400 that may be executed by the example audience data generator 120 of FIGS. 1, 2 and/or 3 to facilitate correcting attribution errors and coverage bias for digital audio ratings. The example instructions 400 of FIG. 4 begin at block 402 when the example audience data generator 120 collects messages indicating impressions of digital audio. For example, the AME impressions collector 218 collects messages (e.g., the beacon/impression requests 212, 226*b*) indicating impressions of digital audio accessed by a client device 102.

At block 404, the example audience data generator 120 receives first demographic data based on the messages. For example, the example DP impressions collector 232 receives, for example, from the data proprietor 116, first demographic data including a number of duration unit counts, a number of session starts counts, a number of QH unit count and/or a number of unique audience counts.

At block 406, the example audience data generator 120 converts a misattribution adjustment matrix from an audience count matrix to a duration-based count matrix. At block 408, the example audience data generator 120 estimates second demographic data by applying the duration-based count matrix to the first demographic data. For example, the example misattribution adjuster 330 may apply (e.g., by performing a dot product calculation) the duration-based count matrix to the first demographic data to estimate misattribution-adjusted demographic data.

At block 410, the example audience data generator 120 estimates third demographic data by applying a coverage adjustment vector to the second demographic data. For example, the example coverage adjuster 332 may calculate a coverage adjustment vector and apply the coverage adjustment vector to the misattribution-adjusted demographic data to estimate coverage-adjusted demographic data.

At block 412, the example audience data generator 120 estimates fourth demographic data by applying a scaling factor to the third demographic data. For example, the data scaler 334 may calculate a scaling factor based on census counts and the coverage-adjusted demographic data to estimate scaled demographic data.

At block 414, the example audience data generator 120 generates ratings data at a daypart-level using the fourth demographic data. For example, the example ratings data generator 336 may use the scaled demographic data to calculate numbers of sessions, duration unit counts, quarter-hour unit counts, unique audience, average minute audience (AMA), average quarter-hour (AQH), total listening hours (TLH), time-spent listening (TSL), session starts share, audience share and/or audience reach for one or more demographic groups at the daypart level. The example process 400 of FIG. 4 then ends.

Figure 5:
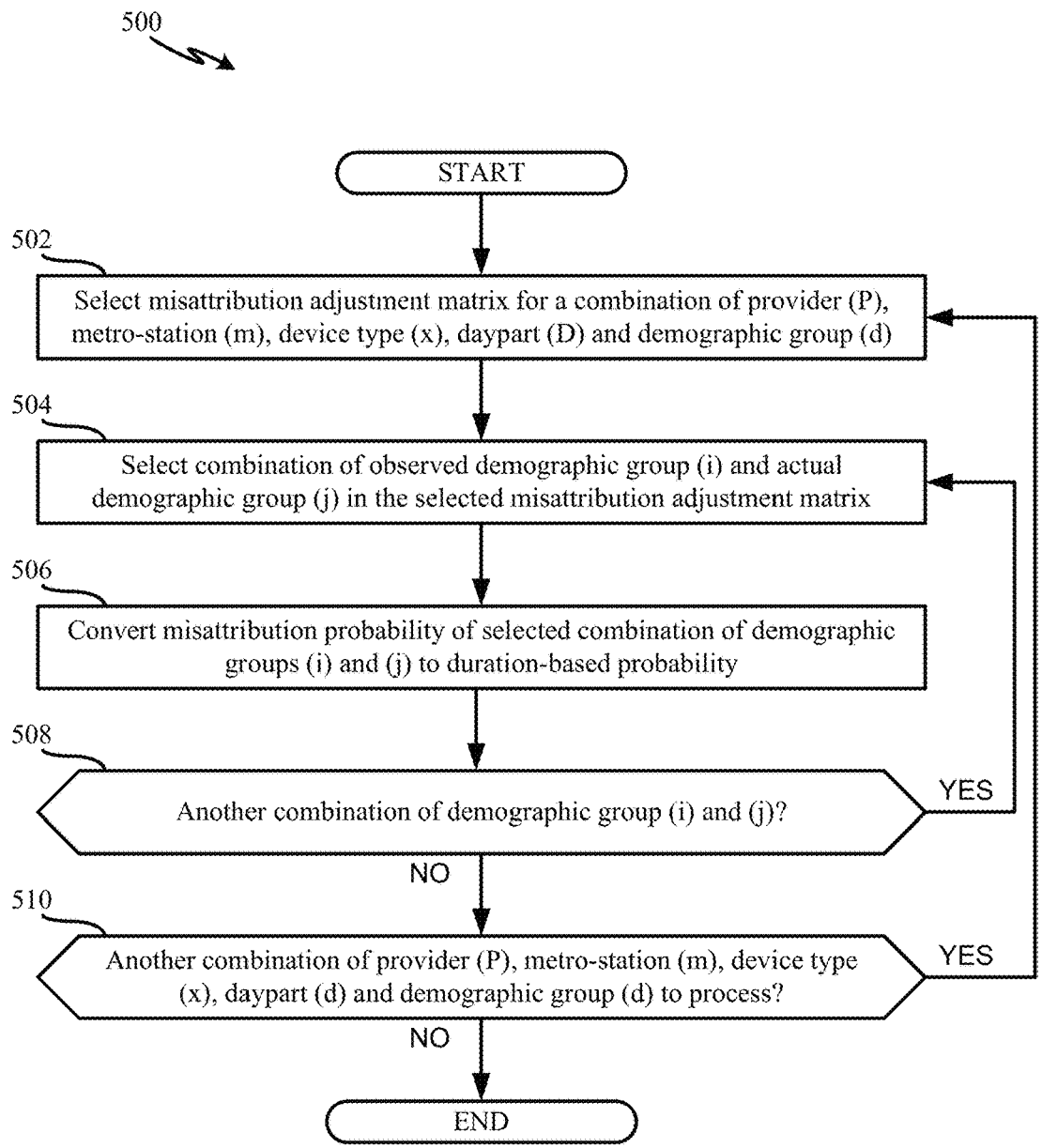

FIG. 5 is a flowchart representative of example machine-readable instructions 500 that may be executed by the example audience data generator 120 of FIGS. 1, 2 and/or 3 to perform the processing at block 406 of FIG. 4 to convert and/or transform the misattribution adjustment matrices, which are determined based on survey calibration data as described above, into duration-based matrices ($DM_{P,m,x,D,DPDemo_i,TrueDemo_j}$). The example instructions 500 of FIG. 5 begin at block 502 when the example matrix converter 328 selects a misattribution adjustment matrix for a combination of a provider (P), a metro-station (m), a device type (x) and a daypart (d). At block 504, the matrix converter 328 selects a combination of demographic groups (i) and (j) in the selected misattribution adjustment matrix. For example, the matrix converter 328 may select one of the demographic groups (i) and one of the demographic groups (j) of the selected misattribution matrix.

At block 506, the example matrix converter 328 converts a misattribution probability of the selected combination of demographic groups (i) and (j) to a duration-based probability. For example, the matrix converter 328 may use Equation 4 above to implement block 506 for a selected probability (e.g., cell) of the selected misattribution adjustment matrix to convert each cell of a misattribution matrix to a duration-based probability.

At block 508, the example matrix converter 328 determines whether there are additional combinations of demographic groups (i) and (j) to process. If, at block 508, the example matrix converter 328 determines that there is an additional combination of demographic groups (i) and (j) to process, control returns to block 504 to selection another combination. If, at block 508, the matrix converter 328 determines that this is not another combination of demographic groups (i) and (j) to process, then, at block 510, the matrix converter 328 determines if there is another combination of a provider (P), a metro-station (m), a device type (x) and a daypart (d) to process. If, at block 510, the matrix converter 328 determines that there is another combination to process, control returns to block 502 to select another combination of a provider (P), a metro-station (m), a device type (x) and a daypart (d) to process.

If, at block 510, the matrix converter 328 determines that there is not another combination to process, the example process 500 of FIG. 5 ends.

Figure 6:
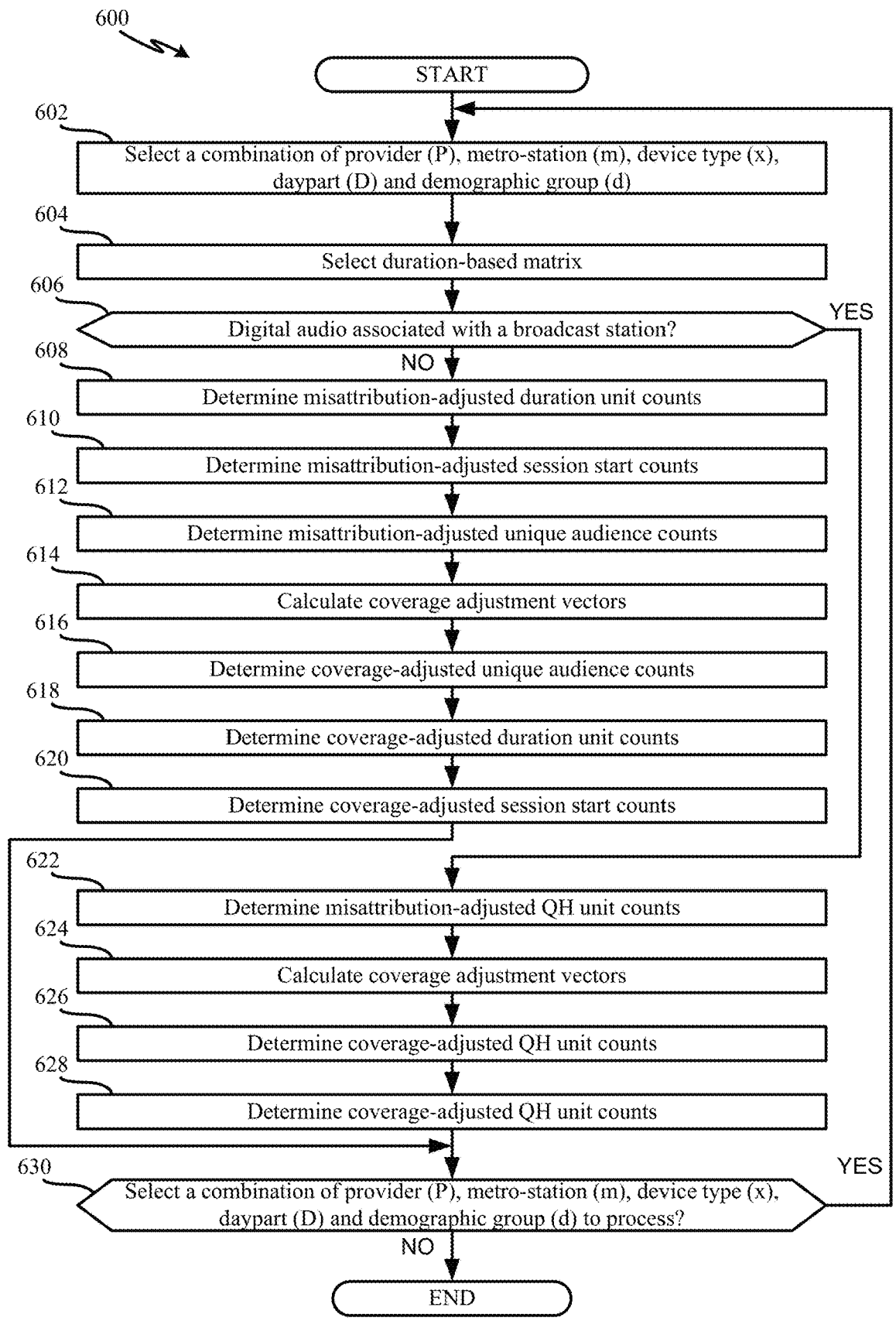

FIG. 6 is a flowchart representative of example machine-readable instructions 600 that may be executed by the example audience data generator 120 of FIGS. 1, 2 and/or 3 to facilitate misattribution attribution and coverage correction of DP-provided demographic data. The example instructions 600 of FIG. 6 begin at block 602 when the example audience data generator 120 selects a combination of a provider (P), a metro-station (m), a device type (x), a daypart (D) and a demographic group (d) to process. At block 604, the example misattribution adjuster 330 selects an appropriate duration-based matrix (e.g., one of the duration-based matrices determined in accordance with the example of FIG. 5). For example, the misattribution adjuster 330 selects a duration-based matrix corresponding to the selected provider (P), metro-station (m), device type(x), daypart (D) and demographic group (d). At block 606, the example misattribution adjuster 330 determines whether the digital audio of interest is associated with a broadcast station. If, at block 606, the misattribution adjuster 330 determines that the digital audio of interest is not associated with a broadcast station (e.g., is associated with a digital station), then, at block 608, the example misattribution adjuster 330 determines misattribution-adjusted duration unit counts (mDuration$_{P,m,x,D,d}$). For example, the example duration sharing adjuster 340 may use Equation 6 above to determine the misattribution-adjusted duration unit counts (mDuration$_{P,m,x,D,d}$).

At block 610, the example misattribution adjuster 330 determines misattribution-adjusted session start counts (mSession$_{P,m,x,D,d}$). For example, the example session sharing adjuster 342 may use Equation 7 above to determines the misattribution-adjusted session start counts (mSession$_{P,m,x,D,d}$).

At block 612, the example misattribution adjuster 330 determines misattribution-adjusted unique audience counts (mUA$_{P,m,x,D,d}$). For example, the example audience sharing adjuster 346 may use Equation 9A above to determine the misattribution-adjusted unique audience counts (mUA$_{P,m,x,D,d}$).

At block 614, the example coverage adjuster 332 calculates coverage adjustment vectors (C$_{P,x,d}$). For example, the example coverage vector calculator 348 receives survey calibration data from the calibration data collector 300 of FIG. 3. The example coverage vector calculator 348 calculates coverage adjustment vectors (C$_{P,x,d}$) for each device type (x) using the survey calibration data. In some examples, the coverage vector calculator 348 may determine a total number of respondents in a demographic group (d) with access to a device of a device type (x) and digital audio provided by provider (P), and divides that number by a covered portion of respondents (e.g., recognized by the DP 116) in the demographic group (d) for the device type (x) and the provider (P).

At block 616, the example coverage adjuster 332 determines coverage-adjusted unique audience counts (cUA$_{P,m,x,D,d}$). For example, the example audience coverage adjuster 350 may use Equation 10 above to calculate the coverage-adjusted unique audience counts (cUA$_{P,m,x,D,d}$).

At block 618, the example coverage adjuster 332 determines coverage-adjusted duration unit counts (cDuration$_{P,m,x,D,d}$). For example, the example duration coverage adjuster 352 may use Equation 11 above to calculate the coverage-adjusted duration unit counts (cDuration$_{P,m,x,D,d}$).

At block 620, the example coverage adjuster 332 determines coverage-adjusted session start counts (cSessions$_{P,m,x,D,d}$). For example, the example sessions coverage adjuster 354 may use Equation 12 above to calculate the coverage-adjusted session start counts (cSessions$_{P,m,x,D,d}$). Control then proceeds to block 630 to determine whether there is another combination of provider (P), metro-station (m), device type (x), daypart (D) and demographic group (d) to process.

If, at block 606, the example misattribution adjuster 330 determines that the digital audio of interest is associated with a broadcast station, then, at block 622, the example misattribution adjuster 330 determines misattribution-adjusted QH unit counts (mQH$_{P,m,x,D,d}$). For example, the example QH sharing adjuster 356 may use Equation 8 above to determine the misattribution-adjusted QH unit counts (mQH$_{P,m,x,D,d}$).

At block 624, the example coverage vector calculator 348 calculates coverage adjustment vectors (C$_{P,x,d}$). At block 626, the example coverage adjuster 332 determines coverage-adjusted unique audience counts (cUA$_{P,m,x,D,d}$). For example, the example audience coverage adjuster 350 may use Equation 10 above to calculate the coverage-adjusted unique audience counts (cUA$_{P,m,x,D,d}$).

At block 628, the example coverage adjuster 332 determines coverage-adjusted QH unit counts (cQH$_{P,m,x,D,d}$) For example, the example QH coverage adjuster 356 may use Equation 13 above to calculate the coverage-adjusted QH unit counts (cQH$_{P,m,x,D,d}$).

At block 630, the example audience data generator 120 determines whether there is another combination of a provider (P), a metro-station (m), a device type (x), a daypart (D) and a demographic group (d) to process. If, at block 630, the example audience data generator 120 determines that there is another combination to process, control returns to block 602 to select another combination. If, at block 630, the example audience data generator 120 determines that there is not another combination to process, the example process 600 of FIG. 6 ends.

Figure 7:
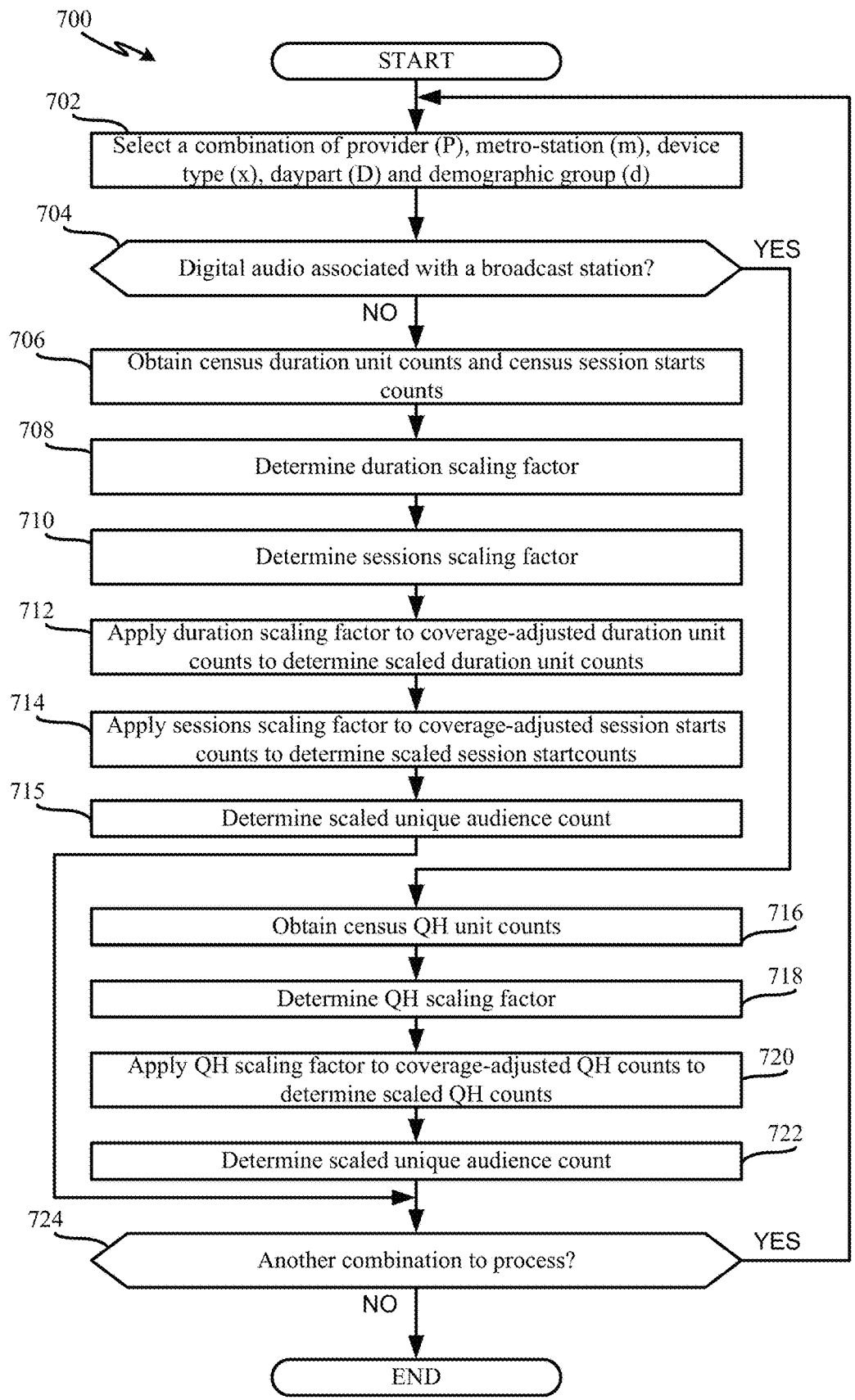

FIG. 7 is a flowchart representative of example machine-readable instructions 700 that may be executed by the example audience data generator 120 of FIGS. 1, 2 and/or 3 to scale demographic data using census counts. The example instructions 700 of FIG. 7 begin at block 702 when the example audience data generator 120 selects a combination of a provider (P), a metro-station (m), a device type (x), a daypart (D) and a demographic group (d) to process. At block 704, the example audience data generator 120 determines whether the digital audio is associated with a broadcast station. If, at block 704, the example audience data generator 120 determines that the digital audio is not associated with a broadcast station, then, at block 706, the example data scaler 334 obtains census duration unit counts (SCDuration$_{P,m,x,D}$) and census session starts counts (SCSession$_{P,m,x,D}$). At block 708, the example data scaler 334 determines a duration scaling factor (DSF$_{P,m,x,D}$). For example, the example duration SFG 358 may use Equation 14 above to determine the duration scaling factor (DSF$_{P,m,x,D}$).

At block 710, the example data scaler 334 determines a sessions scaling factor (SSF$_{P,m,x,D}$). For example, the example sessions SFG 360 may use Equation 15 above to determine the session scaling factor (SSF$_{P,m,x,D}$).

At block 712, the example data scaler 334 applies the duration scaling factor (DSF$_{P,m,x,D}$) to the coverage-adjusted duration unit count (cDuration$_{P,m,x,D,d}$) to determine a scaled duration unit count (sDuration$_{P,m,x,D,d}$). For example, the example durations scaler 364 may use Equation 17 above to determine the scaled duration unit count (sDuration$_{P,m,x,D,d}$).

At block 714, the example data scaler 334 applies the sessions scaling factor (SSF$_{P,m,x,D}$) to the coverage-adjusted session start counts (cSession$_{P,m,x,D,d}$) to determine a scaled session starts count (sSession$_{P,m,x,D,d}$). For example, the example sessions scaler 364 may use Equation 18 above to determine the scaled session starts count (sSession$_{P,m,x,D,d}$).

At block 715, the example data scaler 334 determines the scaled unique audience counts (sUA$_{P,m,x,D,d}$). For example, the audience scaler 370 may use Equation 20A above to determine the scaled unique audience counts (sUA$_{P,m,x,D,d}$). Control then proceeds to block 724 to determine whether there is another combination to process.

If, at block 704, the example audience data generator 120 determines that the digital audio is associated with a broadcast station, then, at block 716, the example data scaler 334 obtains census QH unit counts (SCQH$_{P,m,x,D}$). At block 718, the example data scaler 334 determines a QH scaling factor (QHSF$_{P,m,x,D}$). For example, the example QH SFG 362 may use Equation 16 above to determine the QH scaling factor (QHSF$_{P,m,x,D}$).

At block 720, the example data scaler 334 applies the QH scaling factor (QHSF$_{P,m,x,D}$) to the coverage-adjusted QH unit count (cQH$_{P,m,x,D,d}$) to determine a scaled QH unit count (sQH$_{P,m,x,D,d}$). For example, the example QH scaler 368 may use Equation 19 above to determine the scaled QH unit count (sQH$_{P,m,x,D,d}$).

At block 722, the example data scaler 334 determines the scaled unique audience counts (sUA$_{P,m,x,D,d}$). For example, the audience scaler 370 may use Equation 20B above to determine the scaled unique audience counts (sUA$_{P,m,x,D,d}$). Control then proceeds to block 724 to determine whether there is another combination to process.

At block 724, the example audience data generator 120 determines whether there is another combination of a provider (P), a metro-station (m), a device type (x), a daypart (D) and a demographic group (d) to process. If, at block 724, the example audience data generator 120 determines that there is another combination to process, control returns to block 702 to select another combination. If, at block 724, the example audience data generator 120 determines that there is not another combination to process, the example process 700 of FIG. 7 ends.

Figure 8:
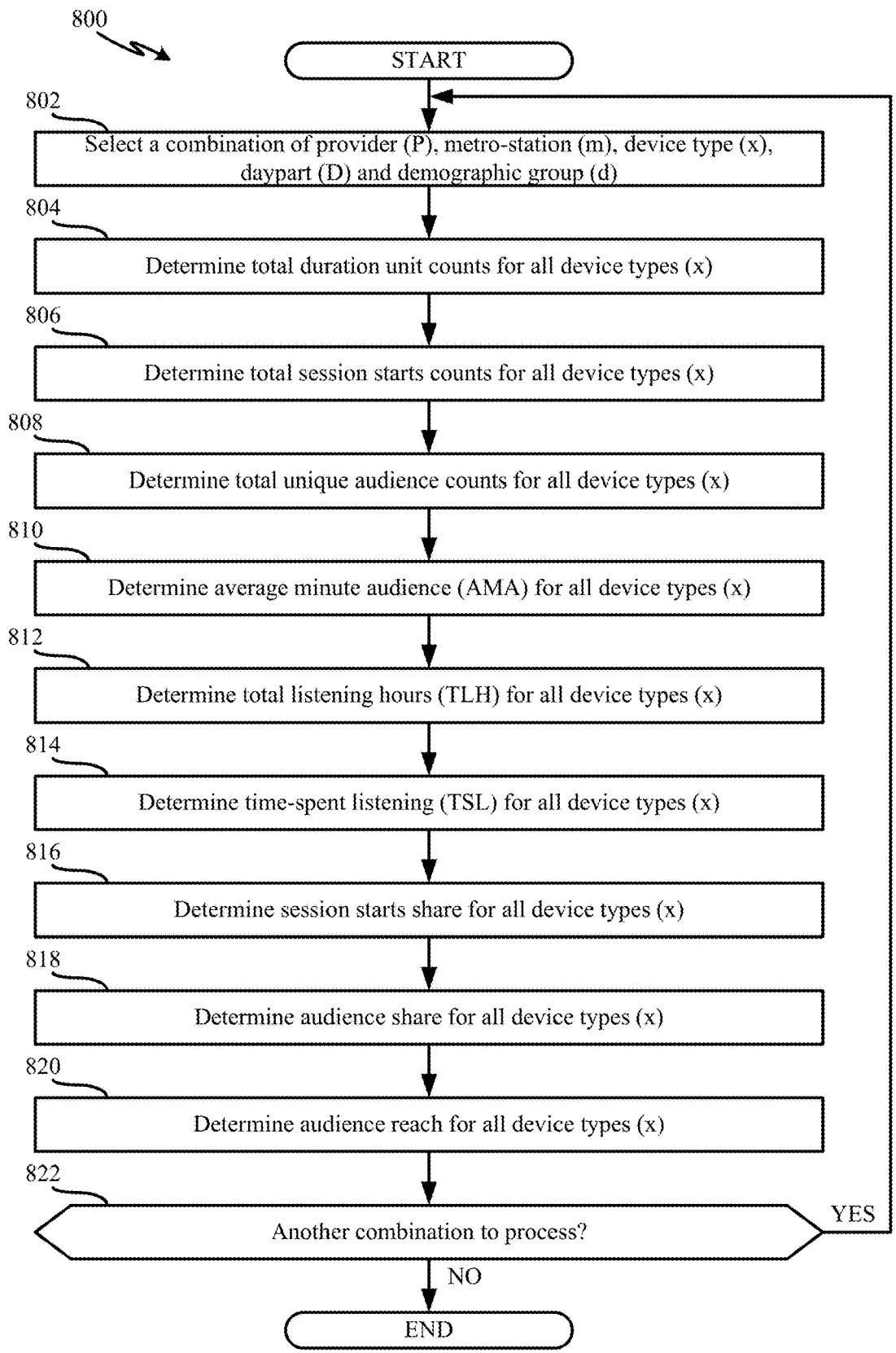

FIG. 8 is a flowchart representative of example machine-readable instructions 800 that may be executed by the example audience data generator 120 of FIGS. 1, 2 and/or 3 to generate ratings data for digital audio associated with a digital station. The example instructions 800 of FIG. 8 begin at block 802 when the example audience data generator 120 selects a combination of a provider (P), a metro-station (m), a device type (x), a daypart (D) and a demographic group (d) to process. At block 804, the example ratings data generator 336 determines total duration unit counts (Duration$_{P,m,x,D}$) for all device types (x) of the selected combination. For example, the example total duration data generator 370 may use Equation 21 above to determine the total duration unit counts (Duration$_{P,m,x,D}$).

At block 806, the example ratings data generator 336 determines total session starts counts (Sessions$_{P,m,x,D}$) for all device types (x) of the selected combination. For example, the example total sessions data generator 372 may use Equation 22 above to determine the total session starts counts (Sessions$_{P,m,x,D}$).

At block 808, the example ratings data generator 336 determines total unique audience counts (UA$_{P,m,x,D}$) for all device types (x) of the selected combination. For example, the example total audience data generator 376 may use Equation 24A above to determine the total unique audience counts (UA$_{P,m,x,D}$).

At block 810, the example ratings data generator 336 determines the average minute audience (AMA) for all device types (x) of the selected combination. For example, the example AMA data generator 378 may use Equation 25 above to determine the AMA (AMA$_{P,m,x,D}$).

At block 812, the example ratings data generator 336 determines total listening hours (TLH) for all device types (x) of the selected combination. For example, the example TLH data generator 382 may use Equation 27A above to determine the TLH (TLH$_{P,m,x,D}$).

At block 814, the example ratings data generator 336 determines time-spent listening (TSL) for all device types (x) of the selected combination. For example, the example TSL data generator 384 may use Equation 28A above to determine the TSL (TSL$_{P,m,x,D}$).

At block 816, the example ratings data generator 336 determines session start shares (SSShare$_{P,m,x,D}$) for all device types (x) of the selected combination. For example, the example session share data generator 386 may use Equation 29 above to determine the session start shares (SSShare$_{P,m,x,D}$).

At block 818, the example ratings data generator 336 determines audience share (UAShare$_{P,m,x,D}$) for all device types (x) of the selected combination. For example, the example audience share data generator 388 may use Equation 30 above to determine the audience share (UAShare$_{P,m,x,D}$).

At block 820, the example ratings data generator 336 determines audience reach (Reach$_{P,m,x,D}$) for all device types (x) of the selected combination. For example, the example session share data generator 386 may use Equation 31 above to determine the audience reach (Reach$_{P,m,x,D}$).

At block 822, the example audience data generator 120 determines whether there is another combination of a provider (P), a metro-station (m), a device type (x), a daypart (D) and a demographic group (d) to process. If, at block 822, the example audience data generator 120 determines that there is another combination to process, control returns to block 802 to select another combination. If, at block 822, the example audience data generator 120 determines that there is not another combination to process, the example process 800 of FIG. 8 ends.

Figure 9:
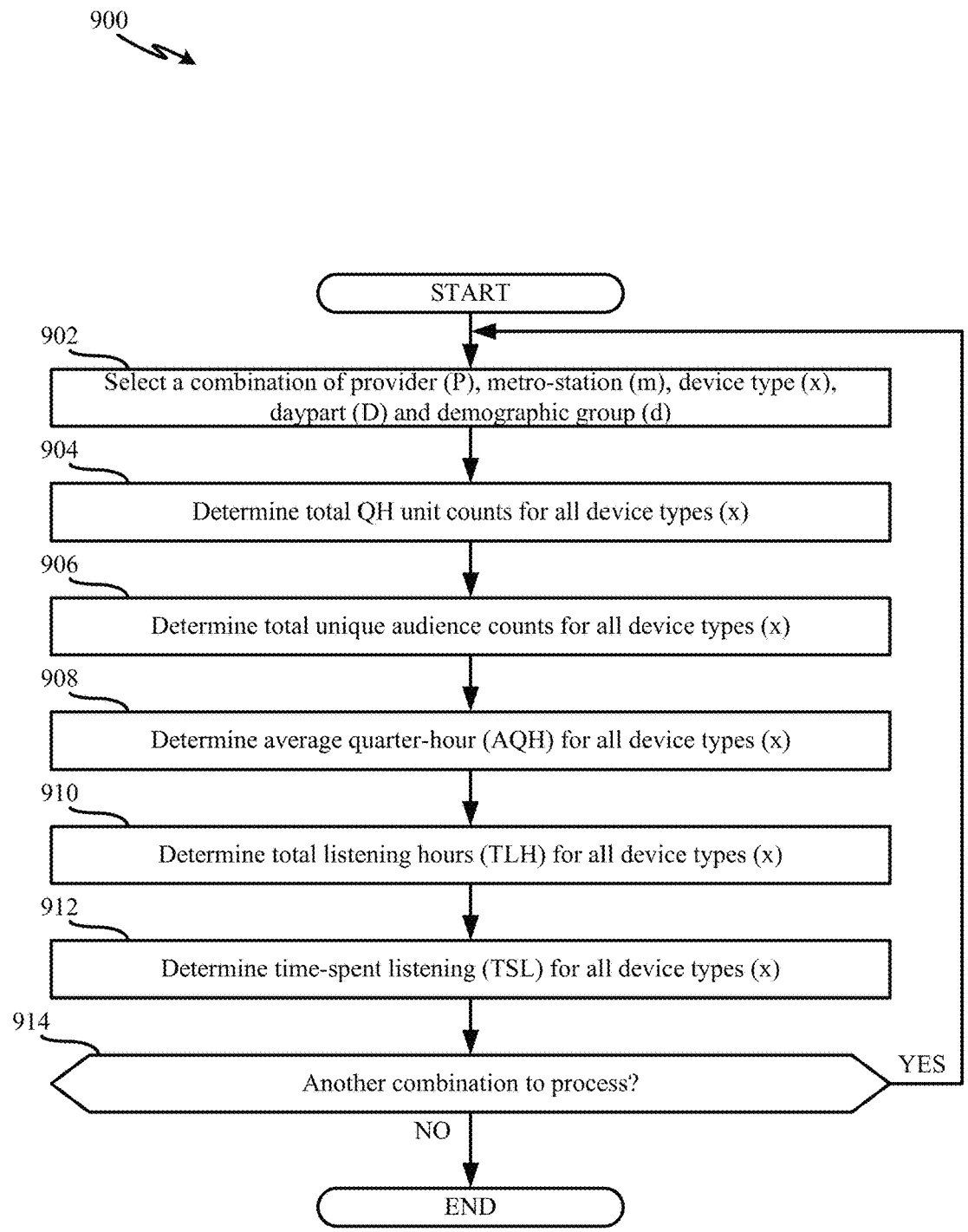

FIG. 9 is a flowchart representative of example machine-readable instructions 900 that may be executed by the example audience data generator 120 of FIGS. 1, 2 and/or 3 to generate ratings data for digital audio associated with a broadcast station. The example instructions 900 of FIG. 9 begin at block 902 when the example audience data generator 120 selects a combination of a provider (P), a metro-station (m), a device type (x), a daypart (D) and a demographic group (d) to process.

At block 904, the example ratings data generator 336 determines total QH unit counts ($QH_{P,m,x,D}$) for all device types (x) of the selected combination. For example, the example total QH data generator 374 may use Equation 23 above to determine the total QH unit counts ($QH_{P,m,x,D}$).

At block 906, the example ratings data generator 336 determines total unique audience counts ($UA_{P,m,x,D}$) for all device types (x) of the selected combination. For example, the example total audience data generator 376 may use Equation 24B above to determine the total unique audience counts ($UA_{P,m,x,D}$).

At block 908, the example ratings data generator 336 determines average quarter-hour (AQH) for all device types (x) of the selected combination. For example, the example AQH data generator 380 may use Equation 26 above to determine the AQH ($AQH_{P,m,x,D}$).

At block 910, the example ratings data generator 336 determines total listening hours (TLH) for all device types (x) of the selected combination. For example, the example TLH data generator 382 may use Equation 27B above to determine the TLH ($TLH_{P,m,x,D}$).

At block 912, the example ratings data generator 336 determines time-spent listening (TSL) for all device types (x) of the selected combination. For example, the example TSL data generator 384 may use Equation 28B above to determine the TSL ($TSL_{P,m,x,D}$).

At block 914, the example audience data generator 120 determines whether there is another combination of a provider (P), a metro-station (m), a device type (x), a daypart (D) and a demographic group (d) to process. If, at block 914, the example audience data generator 120 determines that there is another combination to process, control returns to block 902 to select another combination. If, at block 914, the example audience data generator 120 determines that there is not another combination to process, the example process 900 of FIG. 9 ends.

Figure 10:
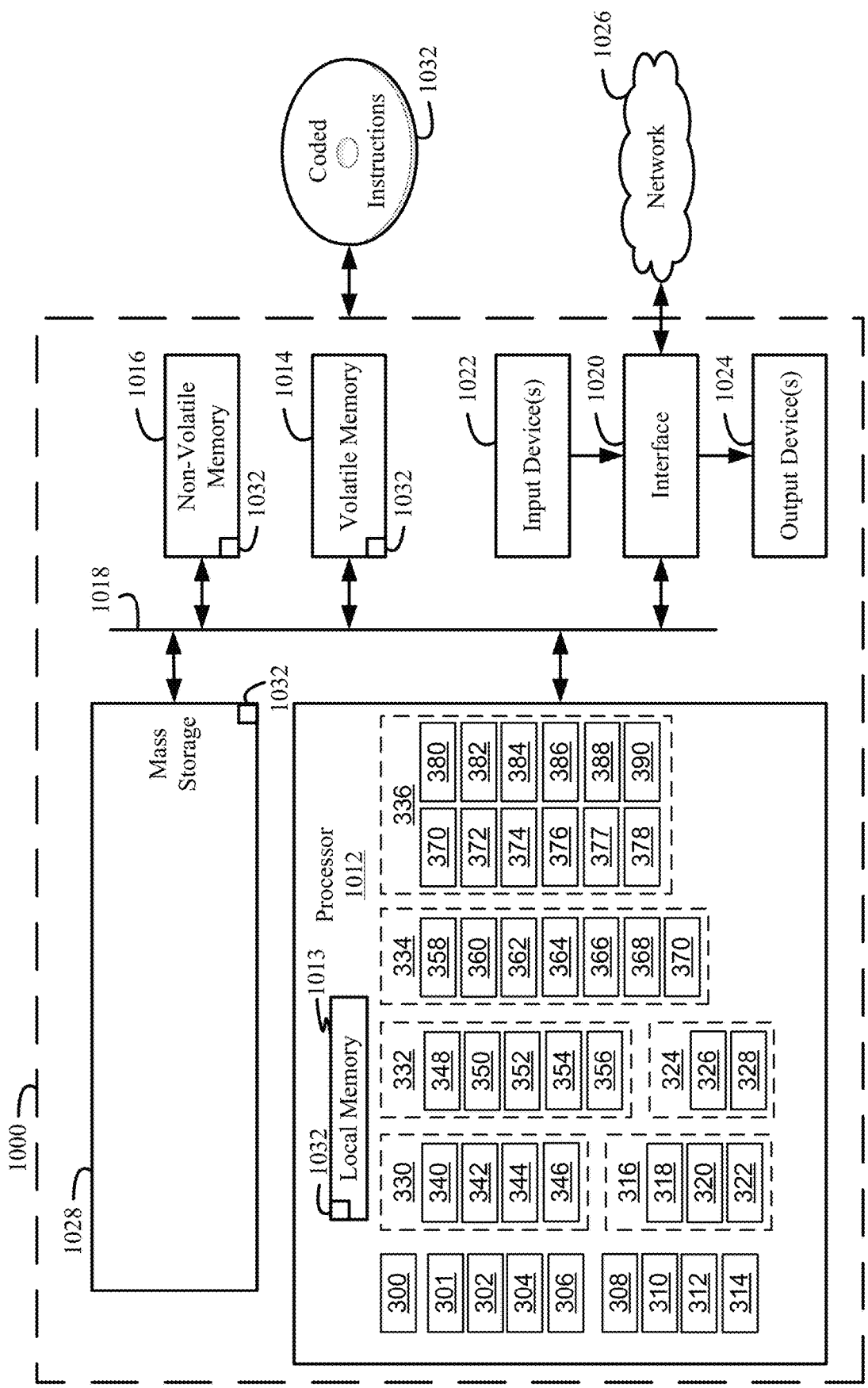
FIG. 10 is a block diagram of an example processing platform structured to execute the example machine-readable instructions of FIGS. 4-8 and/or 9 to implement the example audience data generator of FIGS. 1, 2 and/or 3.

FIG. 10 is a block diagram of an example processor platform 1000 capable of executing the instructions of FIGS. 5-9 and/or 10 to implement the central facility 108 of FIG. 1. The processor platform 1000 can be, for example, a server, a personal computer, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example executes the instructions to implement the example calibration data collector 300, the example audio classifier 301, the example provider data manager 302, the example metro-station data manager 304, the example daypart data manager 306, the example platform data manager 308, the example device data manager 310, the example DP data manager 312, the example demographic distributor 314, the example raw data calculator 316, the example raw DPP calculator 318, the example raw DPS calculator 320, the example raw QHPP calculator 322, the example matrix transformer 324, the example matrix generator 326, the example matrix converter 328, the example misattribution adjuster 330, the example coverage adjuster 332, the example data scaler 334, the example ratings data generator 334, the example duration sharing adjuster 340, the example session sharing adjuster 342, the example QH sharing adjuster 344, the example audience sharing adjuster 346, the example coverage vector calculator 348, the example audience coverage adjuster 350, the example duration coverage adjuster 352, the example sessions coverage adjuster 354, the example QH coverage adjuster 356, the example duration SFG 358, the example sessions SFG 360, the example QH SFG 362, the example durations scaler 364, the example sessions scaler 366, the example QH scaler 368, the example audience scaler 369, the example total duration data generator 370, the example total session data generator 372, the example total QH data generator 374, the example total audience data generator 376, the example audience data error corrector 377, the example AMA data generator 378, the example AQH data generator 380, the example TLH data generator 382, the example TSL data generator 384, the example session share data generator 386, the example audience share data generator 388, the example reach data generator 390.

The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives. The example mass storage 1028 implements the example panelist audio measurement data database 112, the example listening data database 122 and the example filtered listening data database 130.

The coded instructions 1032 of FIGS. 5-9 and/or 11 may be stored in the mass storage device 1028, in the volatile memory 1014, in the non-volatile memory 1016, and/or on a removable tangible computer readable storage medium such as a CD or DVD.

From the foregoing, it will be appreciated that the above disclosed methods, apparatus and articles of manufacture provide a solution to the problem of inaccuracies due to techniques used in digital audio measurement. Benefits to digital audio measurement, which is an inherently network-based technology, obtained from disclosed example methods, apparatus, and articles of manufacture include improving the accuracy of audience measurement for Internet-delivered media such as streaming audio (e.g., digital audio) by correcting for measurement errors arising from problems inherent to computer networks. For example, beacon requests and/or other messages described herein can be dropped or otherwise not delivered to the intended destination (e.g., audience measurement entity, a database proprietor, etc.), which in at least some instances can lead to non-negligible measurement bias At the same time, the improved accuracy of ratings information that can be generated using disclosed examples permits a more efficient and more beneficial distribution of advertising resources to listeners of digital audio by providing rapid, and, more importantly, accurate online audience measurement that enables advertisers to change distributions of advertising resources in response to audience measurement information.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to generate digital audio ratings, the method comprising:
providing media monitoring instructions to instantiate with digital audio, the media monitoring instructions to cause the client devices to send messages to a server of the database proprietor in response to the client devices accessing the digital audio;
collecting, by executing an instruction with a processor, impressions of the digital audio accessed by the client devices;
obtaining, by executing an instruction with the processor, first demographic data from the server of the database proprietor based on the collected impressions, the first demographic data including misattribution errors generated by the server of the database proprietor based on respective cookies included in the messages sent by the client devices to the server of the database proprietor, at least one of the cookies to inaccurately identify a user of a corresponding one of the client devices;
applying, by executing an instruction with the processor, a duration-based count matrix to the first demographic data associated with the collected impressions of digital audio to determine second demographic data, the duration-based count matrix based on a misattribution adjustment matrix, the misattribution adjustment matrix including a first probability that a person is attributable to a first demographic group when the first demographic data associates the person with a second demographic group different from the first demographic group;
converting, by executing an instruction with the processor, the first probability associated with the first demographic group and the second demographic group to a duration-based probability included in the duration-based count matrix, the duration-based probability corresponding to a duration unit count when (1) a streaming station distributing the digital audio is a digital counterpart of an over-the-air station, and (2) the streaming station and the over-the-air station have a same ad-load;
applying, by executing an instruction with the processor, a coverage adjustment vector to the second demographic data to determine third demographic data;
applying, by executing an instruction with the processor, a scaling factor to the third demographic data to determine fourth demographic data; and
generating, by executing an instruction with the processor, ratings data at a daypart-level using the fourth demographic data to correct the misattribution errors generated by the server of the database proprietor, the ratings data associated with the digital audio.

2. The method of claim 1, further including using survey calibration data to determine the probability.

3. The method of claim 1, wherein the duration-based probability corresponds to a quarter-hour unit count when (3) a streaming station distributing the digital audio is not associated with a counterpart over-the-air station or (4) the over-the-station and the streaming station do not have a same ad-load.

4. The method of claim 1, wherein the first demographic data includes at least one of a duration unit count, a session starts count, a quarter-hour unit count and a unique audience count.

5. An apparatus to generate digital audio ratings, the apparatus comprising:
an audience measurement entity impressions collector to:
provide media monitoring instructions to instantiate with digital audio, the media monitoring instructions to cause the client devices to send messages to a server of the database proprietor in response to the client devices accessing the digital audio; and
collect impressions of the digital audio accessed by the client devices;
a database proprietor data manager to obtain first demographic data from the server of the database proprietor based on the collected impressions, the first demographic data including misattribution errors generated by the server of the database proprietor based on respective cookies included in the messages sent by the client devices to the server of the database proprietor, at least one of the cookies to inaccurately identify a user of a corresponding one of the client devices;

a misattribution adjuster to apply a duration-based count matrix to the first demographic data associated with the collected impressions of digital audio to determine second demographic data, the duration-based count matrix based on a misattribution adjustment matrix, the misattribution adjustment matrix including a probability that a person is attributable to a first demographic group when the first demographic data associates the person with a second demographic group different from the first demographic group;

a matrix converter to convert the probability associated with the first demographic group and the second demographic group to a duration-based probability included in the duration-based count matrix, the duration-based probability corresponding to a duration unit count when (1) a streaming station distributing the digital audio is a digital counterpart of an over-the-air station, and (2) the streaming station and the over-the-air station have a same ad-load;

a coverage adjuster to apply a coverage adjustment vector to the second demographic data to determine third demographic data;

a data scaler to apply a scaling factor to the third demographic data to determine fourth demographic data; and a ratings data generator to generate ratings data at a daypart-level using the fourth demographic data to correct the misattribution errors generated by the server of the database proprietor, the ratings data associated with the digital audio.

6. The apparatus of claim 5, further including a matrix generator to use survey calibration data to determine the probability.

7. The apparatus of claim 5, wherein the duration-based probability corresponds to a quarter-hour unit count when (3) a streaming station distributing the digital audio is not associated with a counterpart over-the-air station or (4) the over-the-station and the streaming station do not have a same ad-load.

8. The apparatus of claim 5, wherein the first demographic data includes at least one of a duration unit count, a session starts count, a quarter-hour unit count and a unique audience count.

9. A tangible machine-readable storage medium comprising instructions that, when executed, cause a processor to at least:

provide media monitoring instructions to instantiate with digital audio, the media monitoring instructions to cause the client devices to send messages to a server of the database proprietor in response to the client devices accessing the digital audio;

collect impressions of the digital audio accessed by the client devices;

obtain first demographic data from the server of the database proprietor based on the collected impressions, the first demographic data including misattribution errors generated by the server of the database proprietor based on respective cookies included in the messages sent by the client devices to the server of the database proprietor, at least one of the cookies to inaccurately identify a user of a corresponding one of the client devices;

apply a duration-based count matrix to the first demographic data associated with the collected impressions of digital audio to determine second demographic data, the duration-based count matrix based on a misattribution adjustment matrix, the misattribution adjustment matrix including a probability that a person is attributable to a first demographic group when the first demographic data associates the person with a second demographic group different from the first demographic group;

convert the probability associated with the first demographic group and the second demographic group to a duration-based probability included in the duration-based count matrix, the duration-based probability corresponding to a duration unit count when (1) a streaming station distributing the digital audio is a digital counterpart of an over-the-air station, and (2) the streaming station and the over-the-air station have a same ad-load;

apply a coverage adjustment vector to the second demographic data to determine third demographic data;

apply a scaling factor to the third demographic data to determine fourth demographic data; and generate ratings data at a daypart-level using the fourth demographic data to correct the misattribution errors from the server of the database proprietor, the ratings data associated with the digital audio.

10. The tangible machine-readable storage medium as defined in claim 9, wherein the instructions are to further cause the processor to utilize survey calibration data to determine the probability.

11. The tangible machine-readable storage medium as defined in claim 9, wherein the duration-based probability corresponds to a quarter-hour unit count when (3) a streaming station distributing the digital audio is not associated with a counterpart over-the-air station or (4) the over-the-station and the streaming station do not have a same ad-load.

* * * * *